United States Patent [19]

Spurlin et al.

[11] 4,324,320

[45] Apr. 13, 1982

[54] POWER LIMITING CONTROL FOR RETARDER WITH FRICTION BRAKE

[75] Inventors: Stephen F. Spurlin, Indianapolis; Carl A. Lentz, Mooresville; Clement P. Miller, Indianapolis, all of Ind.

[73] Assignee: General Motors Corporation, Detroit, Mich.

[21] Appl. No.: 50,514

[22] Filed: Jun. 21, 1979

[51] Int. Cl.³ .................... F16F 11/00; B60K 41/20
[52] U.S. Cl. ................................. 188/271; 188/71.6; 188/290; 188/296; 192/4 B; 303/2; 303/93
[58] Field of Search ............... 188/271, 71.5, 290–296, 188/181 R, 71.6, 181 A, 181 C, 181 T, 106 F, 264 R, 264 A, 264 AA, 264 B, 264 D, 264 E, 264 P, 264 F, 264 CC; 303/3, 93, 2, 113, 117, 116, 150–156; 192/4 B, 4 A, 4 R; 74/864

[56] References Cited

U.S. PATENT DOCUMENTS

| | | | |
|---|---|---|---|
| 2,750,009 | 6/1956 | Pohl | 188/290 |
| 3,176,799 | 4/1965 | Müller et al. | 188/271 X |
| 3,858,459 | 1/1975 | Fuehrer et al. | 74/864 X |
| 4,235,320 | 11/1980 | Polak et al. | 188/271 X |

Primary Examiner—Douglas C. Butler
Attorney, Agent, or Firm—A. M. Heiter

[57] ABSTRACT

A brake unit having a hydrodynamic retarder providing brake torque proportional to speed and inlet pressure, and a friction brake providing brake torque proportional to net brake pressure, the brake apply pressure minus retarder inlet pressure. The controls have a brake demand valve providing a brake demand pressure. A retarder valve is biased by brake demand pressure from brake-off position to brake-on position for switching the retarder circuit to fill the retarder and to connect low and high speed regulator valves to regulate retarder inlet pressure respectively to increase in the low speed range and to decrease in the high speed range with increasing speed, and to limit retarder inlet pressure proportionally to brake demand. The controls, in the low speed range, provide friction brake apply pressure proportional to brake demand, so the friction brake net apply pressure and torque decrease to zero and retarder torque increases as speed increases. In the high speed range, retarder torque decreases with increasing speed. Total brake power increases in an approximately straight line relation to speed.

14 Claims, 11 Drawing Figures

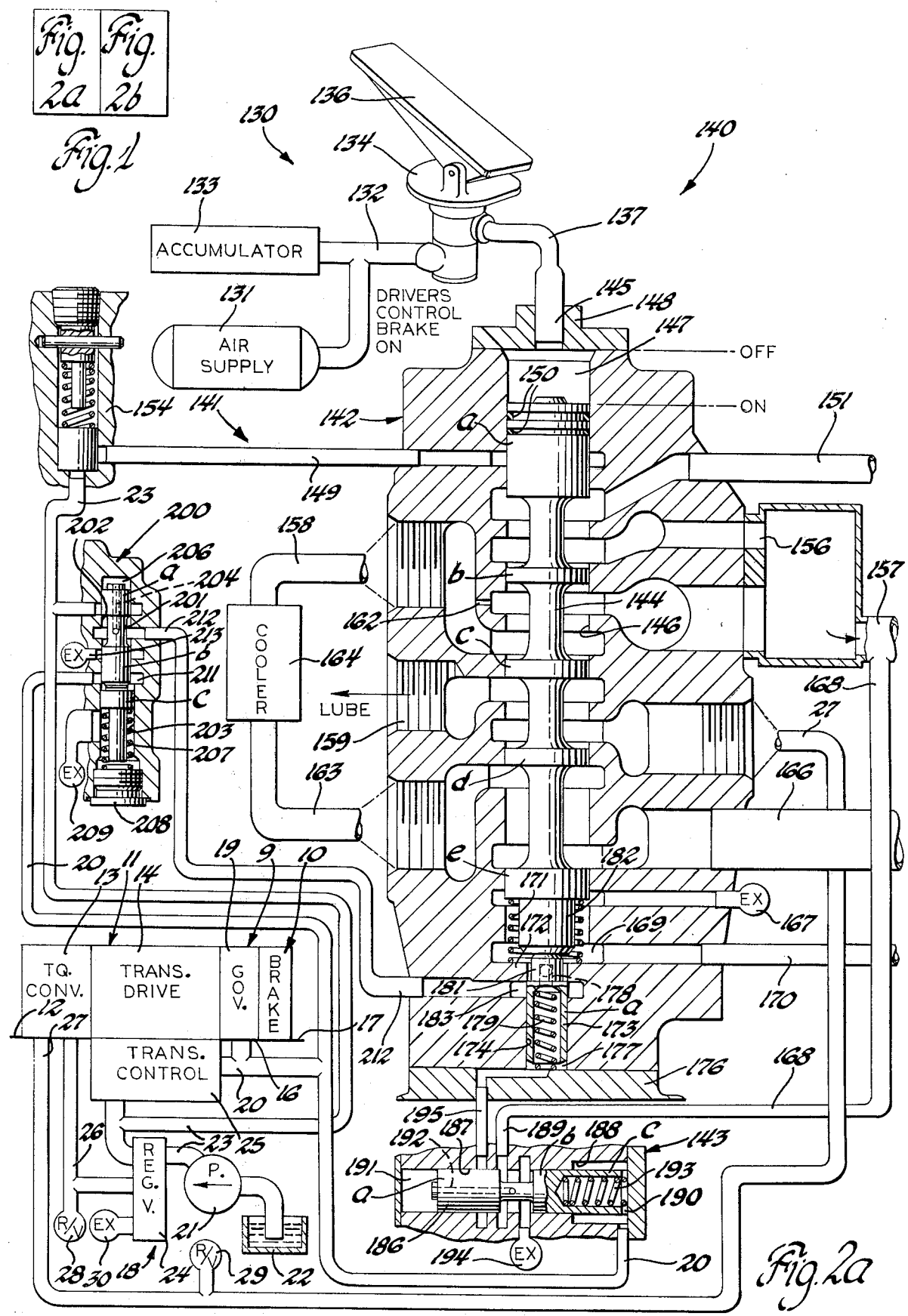

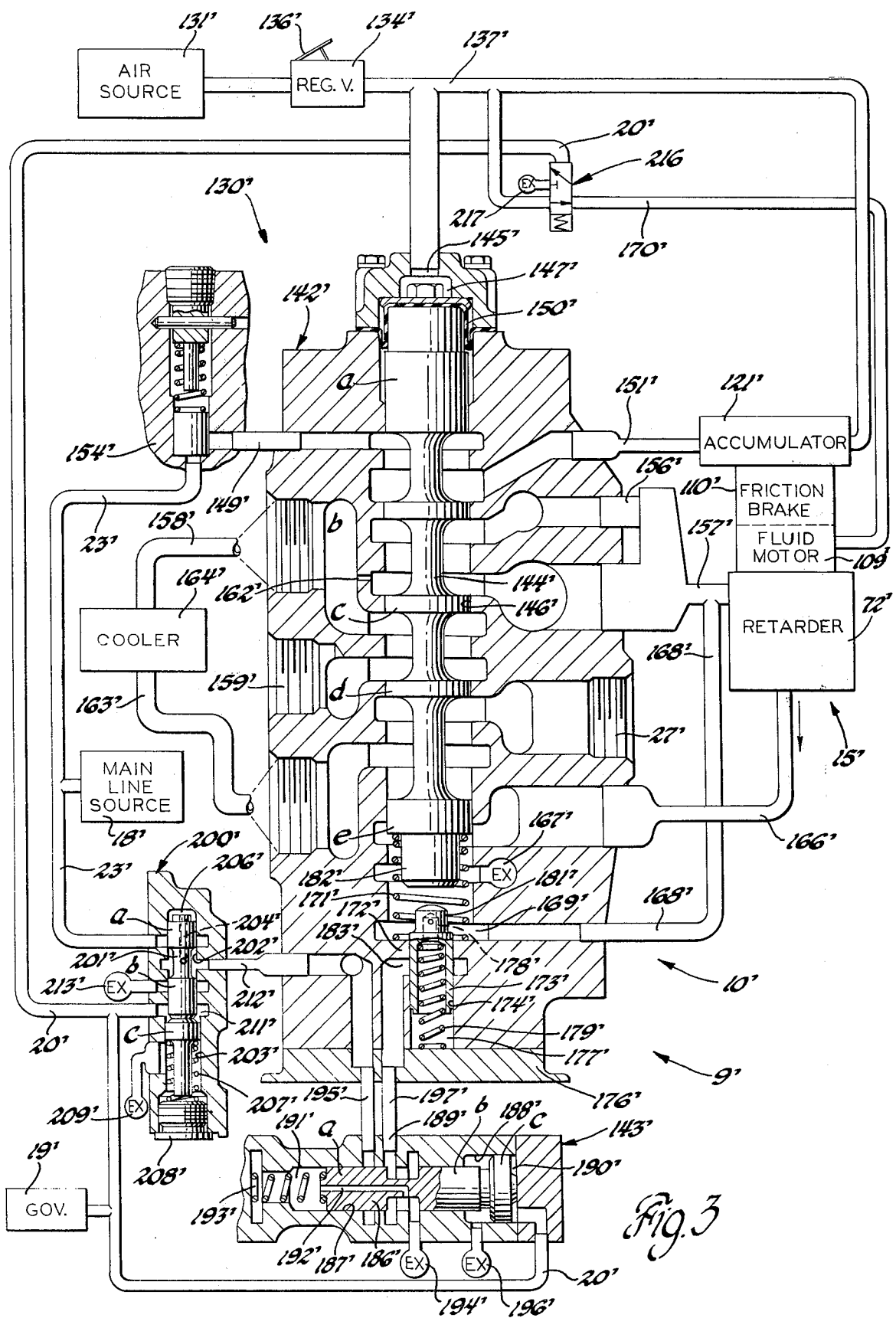

POWER LIMITING CONTROL FOR RETARDER WITH FRICTION BRAKE

This invention relates to a retarder and friction brake assembly and particularly to interacting retarder and friction brake controls therefor responsive to brake demand and speed.

RELATED APPLICATION

The U.S. application Ser. No. 913,969 entitled "Retarder and Friction Brakes", by James C. Polak et al, filed June 9, 1978, now U.S. Pat. No. 4,235,320, by the common assignee, is related.

SUMMARY OF THE INVENTION

This invention provides a brake unit having a retarder or hydrodynamic brake and a friction brake controlled in a high speed range to limit brake torque by providing total brake torque decreasing with increasing speed, and total power moderately increasing and approximating a straight line relation with increasing speed to meet vehicle brake torque and power requirements and drive line capacity. The multiplate friction brake is located concentrically within the retarder so retarder inlet fluid flows through the friction brake for cooling the friction brake and retarder in a loop circuit having a cooler. The retarder provides maximum capacity brake torque increasing at a high exponential rate in proportion to speed when the retarder inlet pressure meets maximum capacity requirements which similarly increase with speed and lower brake torque in substantially direct proportion to lower retarder inlet pressure. The friction brake provides brake torque proportional to the differential or net brake pressure acting on the brake apply piston. The net brake pressure is the brake apply pressure minus the retarder inlet pressure which also acts as a friction brake release pressure.

The retarder and friction brake controls have a brake demand control providing a brake demand pressure proportional to brake demand for controlling a retarder valve which provides switching and brake demand regulating functions. The retarder valve, in response to zero or minimum brake demand is placed in a brake-off position to exhaust the retarder and, in response to a low switching brake demand value, is switched to brake-on position to fill the retarder and establish the retarder cooler loop circuit. The retarder valve connects the accumulator to fill the retarder loop circuit. The retarder valve, in response to a bias force proportional to brake demand, the brake demand pressure, regulates brake control pressure proportional to brake demand.

The controls also have a low speed regulator valve regulating low speed regulated pressure which increases with increasing speed and is used in a low speed range to provide retarder inlet pressure which is about as high as or preferably meets, or is greater than maximum capacity retarder inlet pressure requirements to provide high or preferably maximum capacity retarder torque increasing with speed in the low speed range. The controls also have a high speed regulator valve regulating high speed regulated pressure which decreases with increasing speed from a maximum at zero speed to an intermediate pressure at maximum speed and is used in a high speed range to provide decreasing retarder inlet pressure with increasing speed to provide retarder brake torque having less than maximum capacity and decreasing with increasing speed to reduce the increase of brake power with speed. At maximum brake demand, retarder inlet pressure increases in part or all of a low speed range with increasing speed to provide the maximum capacity retarder torque as it increases with speed and decreases in a high speed range from the highest pressure value in the low speed range to a lower value with increasing speed to decrease retarder torque with increasing speed. These increasing and decreasing regulated pressures are connected to control retarder inlet pressure in the low speed range to increase from zero or a low value up to a peak or maximum pressure value at a transition speed and then in a high speed range to decrease to an intermediate pressure value as speed increases from zero to maximum speed. The regulated retarder inlet pressure also increases with increasing brake demand controlled by the regulating operation of the retarder valve. The regulated retarder inlet pressure value is the lower of the pressure values regulated by speed and brake demand.

The controls, the brake demand control and retarder valve provide a friction brake apply pressure proportional to brake demand and a friction brake release pressure proportional to or provided directly by retarder inlet pressure to provide friction brake net apply pressure and torque decreasing with increasing speed and inversely proportional to retarder torque increasing with speed.

In a first embodiment, the brake demand valve controls the brake demand pressure in proportion to brake demand. The brake demand pressure switches and biases the retarder valve for regulation. The high speed or first supply regulator valve supplies a first supply pressure which decreases with increasing speed in both the low and high speed ranges to the retarder valve. The retarder valve limits or regulates the maximum pressure value of regulated first supply pressure at increasing pressure values with increasing brake demand and supplies this dual regulated second supply pressure decreasing with increasing speed and increasing with brake demand as friction brake apply pressure to the cylinder of the brake apply motor, and as a supply pressure to the low speed or second supply regulator valve. The second supply regulator valve regulates third supply pressure which is retarder inlet and friction brake releaase pressure to increases in the low speed range with speed and does not regulate in the high speed range. Second supply pressure used for friction brake apply pressure, has the lower pressure value of the pressure values of first supply pressure regulated by the first regulator valve in response to speed and the pressure value regulated by the retarder valve in response to brake demand. The third supply pressure has the lowest pressure value of both pressure values of the second supply pressure and the pressure value regulated by the second supply regulator valve. Thus, friction brake apply pressure decreases with increasing speed in the full-speed range, and retarder inlet pressure and friction brake releaase pressure increase with increasing speed in a low speed range, and decrease with increasing speed in a high speed range to provide, in the low speed range, maximum capacity retarder torque increasing with increasing speed and friction brake torque decreasing with increasing speed and, in the high speed range, decreasing retarder torque and moderately increasing retarder power with increasing speed and substantially no friction brake torque. The low speed or second supply regulator valve provides third supply or retarder inlet pressure regulated at a low pressure value at zero speed at pressure values increasing at a lower rate than the retarder inlet pressure required for maximum capacity retarder torque in the low speed range to the pressure required to provide peak retarder pressure and torque and to equal friction brake apply pressure to reduce net friction brake apply pressure and torque substantially to zero.

In the first embodiment, the brake demand air pressure provided by the brake demand valve is used to control and bias the retarder valve. The retarder valve controls the flow of fluid, such as oil or transmission fluid, in retarder-off position, to charge a spring biased accumulator and exhaust the retarder, and to discharge the spring biased accumulator to fill the retarder, and then regulate in conjunction with the high speed regulator valve and supply fluid pressure for friction brake apply, and regulate, in conjunction with both the low and high speed regulator valves, and supply the retarder inlet and friction brake release pressure. The low speed regulator valve provides a positive low pressure at zero and low speeds for rapid fill of the retarder and loop circuit for maximum capacity retarder torque at low speeds and lower friction brake capacity.

In a first modification having similar components, the brake demand valve supplies brake demand air pressure to similarly switch and bias the retarder valve for regulation, through a governor controlled valve to provide the friction brake apply pressure and to bias and discharge the accumulator. The high speed regulator valve is connected in series through the low speed regulator valve to supply the regulating chamber of the retarder valve for further regulation or limiting of the liquid retarder inlet pressure proportional to brake demand. In this first modified brake control system, the series-connected high and low speed regulator valves supply to the retarder valve a regulated supply pressure increasing with increasing speed in a low speed range to a peak maximum pressure value and, in a high speed range, to reduce the regulated supply pressure from the peak maximum pressure value with increasing speed, to an intermediate pressure value. The retarder valve, in the full-brake demand position, controls the connection of regulated supply pressure to the retarder inlet, preferably by an unregulated connection, to provide in the low speed range retarder inlet pressure increasing with speed to the peak maximum pressure value to provide maximum capacity retarder torque increasing with speed to the peak maximum pressure value and, in the high speed range, retarder inlet pressure and torque decreasing from the peak maximum value to an intermediate pressure value with increasing speed to provide moderately rising retarder power. As brake demand decreases, the retarder valve proportionally decreases the maximum retarder inlet pressure and torque. In the low speed range, the brake demand valve supplies brake demand air pressure in a constant proportion to brake demand through the governor controlled valve to provide friction brake apply pressure to the friction brake. Since retarder inlet pressure also acts as a friction brake release pressure, as retarder torque increases, friction brake torque inversely decreases to provide decreasing total brake torque for moderately increasing total brake power in the low speed range. At a second transition speed, the governor controlled valve reduces and discontinues the supply of friction brake apply pressure to discontinue friction braking in the high speed range.

In a second and now preferred modification similar to the first embodiment, the modified low speed regulator valve provides decreasing retarder inlet pressure in the lower speed portion of the low speed range and increases at a lower rate to extend the low speed range, so the net friction brake apply pressure has a constant intermediate value at lower speeds and decreases gradually, so maximum friction brake torque is substantially less than the peak maximum retarder pressure value and torque and decreases gradually to zero at a higher transition speed.

BRIEF DESCRIPTION OF THE DRAWINGS

These and other features of the invention will be more apparent from the following description and accompanying drawings, wherein:

FIG. 1 shows the arrangement of FIGS. 2a and 2b;

FIGS. 2a and 2b, when arranged as shown in FIG. 1, provide a schematic view of the transmission and brake system with the retarder valve in brake-on position;

FIG. 3 is a schematic view showing a first modification;

Figure 2B:
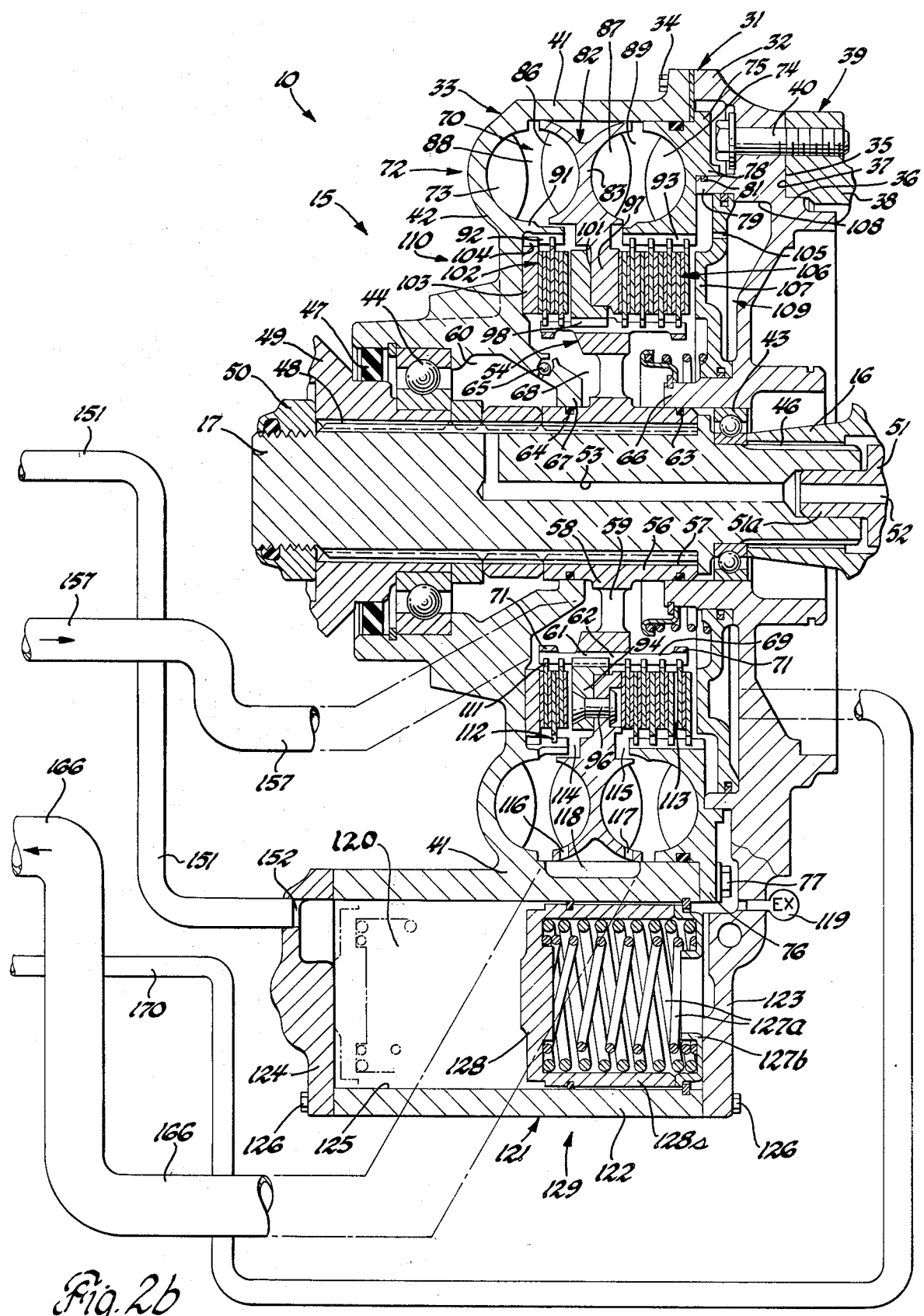

The transmission and brake assembly 9 schematically shown in FIG. 2a, has a brake unit 10 of the retarder and friction type mounted at the rear of the transmission 11 which has an input shaft 12 drive-connected by a torque converter 13 and a multiratio transmission drive 14 to the transmission output shaft 16 which is drive-connected to the brake shaft 17 providing the final output shaft of transmission and brake assembly 9. Transmission 11 preferably is a known automatic powershift multigear ratio transmission having a source 18 of high regulated pressure fluid and a governor 19 driven by transmission output shaft 16, shown, e.g., in U.S. Pat. No. 3,691,872 to Robert H. Schaefer et al, dated Sept. 19, 1972, but other types of transmissions may be used. Governor 19 also may be in brake unit 10 and driven by brake shaft 17. Governor 19, preferably a two-weight type governor, provides a governor signal or pressure having a step type curve approximating a straight line, in governor pressure line 20 proportional to transmission output shaft or brake shaft speed for transmission control 25 and retarder control 141, FIG. 2a. If the transmission used does not have a fluid source and a governor, these components, which are also used for control of brake unit 10, would be in brake unit 10.

The source 18 of high regulated pressure fluid is provided by a pump 21 driven by input shaft 12. Pump 21 draws fluid from sump 22 and delivers fluid to mainline 23 at a high pressure (e.g., 100 psi or higher) regulated by the main regulator valve 24, and supplies transmission control 25 and retarder control 141. Main regulator valve 24 regulates mainline pressure and delivers first overage fluid to the converter supply or inlet line 26 which is connected to supply fluid to torque converter 13 and second overage fluid to exhaust 30. Fluid flows through torque converter 13 to converter outlet line 27 to provide a source of fluid for brake unit 10, as described below. Converter supply line 26 and converter outlet line 27 respectively have relief regulating valves 28 and 29 to regulate converter supply pressure at an intermediate value, e.g. 32–52 psi, and converter outlet pressure at a lower value, e.g. 20–30 psi. Lubrication, leakage and exhaust fluid from transmission 11, transmission control 25 and retarder control 141 return to sump 22.

Brake unit 10 has brake unit control 130 shown in detail in FIG. 2a and brake subassembly 15 including retarder 72, friction brake 110 and accumulator 121 shown in detail in FIG. 2b. The brake subassembly 15 has a brake housing 31 having a front wall 32 and a cover member 33 secured together by fasteners or screws 34. Front wall 32 has a face 35 and a pilot flange and seat 36 respectively abutting and sealed to end face 37 and the inner diameter of the barrel portion 38 of transmission housing 39 of transmission 11. Screws 40 secure and seal front wall 32 to barrel portion 38. Front wall 32 also provides the rear wall of transmission housing 39 and supports components of brake unit 10 and transmission 11. Cover member 33 has a cylindrical or peripheral wall portion 41 and a rear wall 42. These front and rear walls or side wall and peripheral wall provide a closed housing having inner brake chamber 68 and retarder chambers 88 and 89. Brake shaft 17 is rotatably supported by front bearing 43 in front wall 32 and by rear bearing 44 in rear wall 42. Connecting splines 46 provide the drive connection between the transmission output shaft 16, which in transmission 11 is a sleeve shaft portion of an output carrier, and brake shaft 17. A rear seal 47 located to the rear of rear bearing 44 provides a seal between brake shaft 17 and rear wall 42 of brake housing 31. Brake shaft 17 has splines 48 to connect the brake shaft to the load, such as a vehicle propeller shaft and drive axle, as shown by connecting member 49 secured by locknut 50. Transmission intermediate shaft 51 is rotatably supported in brake shaft 17 by bearing 51a, and has a lubrication passage 52 which is supplied from lubrication line 159 (described below), through a known lubrication system (not shown) in the transmission 11. Lubrication passage 52 is connected to lubrication passage 53 in brake shaft 17 for lubricant feed to rear bearing 44. Lubricant is fed from lubrication passage 52 to conventionally lubricate transmission 11 and front bearing 43. A hub 54, located in brake housing 31, has an inner mounting sleeve 56 mounted on brake shaft 17 by drive-connecting splines 57 on sleeve 56 and splines 48 on brake shaft 17 to provide a drive connection between brake shaft 17 and hub 54. Hub 54 has a web 58 with apertures 59 therein connecting sleeve 56 to the inner drum 61 which has external splines 62. Seals 63 and 64 on opposite ends of sleeve 56 have sealing engagement respectively with annular portions 66 and 67 on front wall 32 and rear wall 42 to seal inner brake chamber 68 in brake housing 31 to prevent leakage to lubrication passages 52, 53 and through bearings 43 and 44 between brake shaft 17 and walls 32 and 42.

The space 60 between annular portion 67 and bearing 44 is vented (not shown) to transmission housing 39 above the fluid level so space 60 has atmospheric pressure and excess fluid supplied by lubrication line 53 is returned to sump 22. Check valve 65 prevents fluid flow from chamber 68 to space 60 and permits air to flow from space 60 to chamber 68 to aid rapid exhaust of fluid from chamber 68 and retarder chambers 88, 89 in retarder off.

Inner drum 61 has a plurality of apertures 69 (FIG. 2b) on each side of the web 58 and an internal annular dam 71 at each end of drum 61 to collect and centrifugally supply retarder brake fluid to the brake plates 111 and 112 for lubrication and cooling and flow through grooves 113 in the plates to the retarder 72, as explained below with regard to the operation. The apertures 69 are formed by an annular internal recess in inner drum 61 open to external splines 62, so the spaces between splines 62 provide the apertures. The total flow capacity of the apertures 69 and grooves 113 is sufficient to meet the full retarder cooling requirements under regulated inlet pressure.

Retarder 72 is located in an outer chamber 70 of brake housing 31 and has a first annular bladed stator member 73 formed as a portion of rear wall 42 at the outer diameter, and an oppositely facing second annular bladed stator member 74 having a flange 75 at the outer diameter thereof for sealing and ears 76 secured and sealed by screws 77 to cylindrical wall portion 41. Second stator member 74 has a seal step 78 adjacent a seal flange 79 on front wall 32 with an annular seal 81 therebetween. Rotor 82 has an outer bladed member 83 having first and second bladed portions 86 and 87 respectively facing first and second annular stator members 73 and 74 to form first and second toroidal flow retarder chambers 88 and 89 of outer chamber 70, a dual retarder chamber. First stator member 73, a portion of rear wall 42, has a cylindrical flange 91 having internal splines 92 within first retarder chamber 88. Second bladed stator member 74 has internal splines 93 within second retarder chamber 89. Rotor 82 has a connecting portion 94 secured by rivets or bolts 96 to the inner portion 97 of outer bladed member 83. Connecting portion 94 has internal splines 98 splined to external splines 62 on inner drum 61. Connecting portion 94 and inner portion 97 of rotor 82 form an intermediate plate 101 having opposite flat annular faces. A first group of brake plates 102 is located concentrically within first retarder chamber 88, between intermediate plate 101 and a backing plate 103 secured by external splines 104 to internal splines 92 of flange 91 on wall 42. A second group of brake plates 106 is located on the opposite side of intermediate plate 101, between intermediate plate 101 and piston 107 which is axially and reciprocally mounted and sealed in a cylinder 108 formed in front wall 32. Piston 107 and cylinder 108 form friction brake apply motor 109.

The friction brake 110, having backing plate 103, first group of plates 102, intermediate plate 101, second group of plates 106 and friction brake apply motor 109, provides a partition between and divides the brake housing 31 into inner inlet brake chamber 68 and outer chamber 70 having first and second retarder chambers 88 and 89. The plates of first and second plate groups 102 and 106 each have alternate plates 111 splined internally to external splines 62 on inner drum 61, and intermediate plates 112 externally splined respectively to internal splines 92 and 93 of first and second stator members 73 and 74. Alternate plates 111 are the faced plates and have radial and spiral cooling fluid-flow grooves 113 therein for fluid flow from inner brake chamber 68 to retarder chambers 88 and 89, as described below. Cooling grooves 113 provide a substantially constant restricted passage for fluid flow, sufficient to meet retarder requirements, through the above partition with the plates in contact.

The regulated retarder inlet pressure is supplied by retarder inlet line 157 to inner brake chamber 68. Apertures 59 in web 58 provide for fluid flow through web 58 to fill chamber 68 on both sides of web for fluid flow through apertures 69 in inner drum 61 on both sides of web 58 and through grooves 113 in both the first and second group of brake plates 102 and 106, respectively, to the first and second chamber inlets 114 and 115 for filling and flow through retarder chambers 88 and 89, through radial outlet ports 116 and 117 in the outer diameter portion of first and second bladed rotor portions 86 and 87, to the partial-annular outlet 118 connected to retarder outlet line 166.

The fluid accumulator 121 has a cylindrical housing 122 formed integrally with cylindrical wall portion 41, an end plate 123 formed integrally with front wall 32, and a separate end plate 124. End plates 123 and 124 are secured and sealed by screws 126 to cylindrical housing 122. Piston 128 has a skirt 128s which is slidably mounted and sealed in cylinder 125 in housing 122. Dual springs 127a are seated and located at opposite ends thereof by annular recesses in piston 128 and seat member 127b which abuts end plate 123. Piston skirt 128s abuts the outer edge of seat member 127b in the charged position shown in solid lines of FIG. 2b with accumulator chamber 120 charged by accumulator line 151 and port 152 to maximum volume and dual springs 127a fully compressed. Exhaust 119 vents the spring chamber portion of cylinder 125 to the transmission housing 39. Three of these fluid accumulators 121 are used to provide a large fluid volume accumulator assembly 129 in a smaller diameter brake unit 10.

The brake unit control 130 may employ conventional types of vehicle brake pressure control systems. In FIG. 2a, a typical air pressure brake apply system is used having an air supply 131 providing constant regulated air pressure (e.g., 100 psi), to air supply line 132 which is connected to air accumulator 133 and to a conventional air brake regulator valve 134 operated by vehicle operator pedal 136 to supply regulated brake demand air pressure to brake demand line 137. As pedal 136 is moved from brake OFF position to brake FULL-ON position (zero to maximum brake demand), the brake demand pressure proportionally increases, e.g., 0 to 65 psi. Brake demand line 137 is connected to air chamber 147 of retarder valve 142 to bias retarder valve 142 of retarder control 141.

The brake unit control 130 includes a retarder control 141 and a friction brake control 140. These controls have a retarder valve 142 and 1st and 2nd regulator valves 200 and 143. Retarder valve 142 is operative in OFF position to exhaust or dump retarder 72 and friction brake apply line 170 to charge accumulator 121 and to connect converter outlet line 27 to cooler 164, and is operative in response to a low switching brake demand air pressure to switch to ON position to fill retarder 72, establish the retarder loop circuit through cooler 164, and regulate 2nd supply pressure in 1st chamber 169 which is connected to friction brake apply line 170.

High-speed or 1st regulator valve 200 is fed by mainline 23 and regulates and supplies 1st supply pressure (Curve 236, FIG. 5), to 1st supply line 212 and supply port 183 of retarder valve 142 at a pressure decreasing from maximum (point 237) through peak pressure (point 233) at transition speed (T) to intermediate pressure value (point 238) as speed increases from zero to maximum speed. Retarder valve 142, in ON regulating position, is fed with 1st supply pressure and regulates 2nd supply pressure in chamber 169 increasing from zero through an intermediate value (Curve 241, FIG. 6), to a maximum (Curve 240, FIG. 5), the same as peak 1st supply pressure (point 233), as brake demand increases from the switching value, e.g., 15 psi, to maximum value, e.g., 65 psi, and supplies 2nd supply pressure to friction brake apply 170 and to 2nd supply connecting feed line 195 to 2nd regulator valve 143. The 2nd supply pressure thus increases with increasing brake demand up to a limit value of 1st supply pressure, or the lower pressure value of pressures regulated by 1st regulator valve 200 and retarder valve 142. Thus, at a low brake demand (30 psi brake demand pressure), 2nd supply pressure (Curve 241, FIG. 6) has a constant pressure value which is less than 1st supply pressure (Curve 236) and at higher brake demand values is higher up to the limit values of 1st and 3rd regulated supply pressures. The 2nd regulator valve 143 is supplied by 2nd supply pressure and regulates a 3rd supply pressure (Curve 231, FIG. 5), connected to connecting supply line 189, branch 168, and retarder inlet line 157. The 3rd supply pressure, at maximum brake demand in the low speed range, has pressure values increasing with speed in about the proportion and has the same or higher pressure value (Curve 231) as the retarder inlet pressure (Curve 234), providing maximum retarder torque and increases up to a peak pressure value (point 233), equal to 1st supply pressure at the transition speed (T), providing peak retarder torque. In the high speed range, retarder inlet pressure decreases with increasing speed (Curve 236), to reduce retarder torque. The 3rd supply pressure is also limited in proportion to the brake demand pressure and speed limit values of 2nd supply pressure, FIG. 6.

Retarder valve 142, FIG. 2a, has a main valve element 144 having equal-diameter lands 144a, b, c, d, and e, in a bore 146. Brake demand line 137 is connected by port 145 to air chamber 147 in the end of bore 146 closed by cover 148 to act on the free end area of land 144a to bias main valve element 144 from brake-off position, indicated by OFF, to brake-on and regulating position, indicated by ON, to provide the pressure increasing bias force. Land 144a has annular seals 150 to seal air chamber 147. The retarder valve 142, with main valve element 144 switching between ON and OFF positions, provides the following connections: When retarder valve 142 is in brake-OFF position and mainline 23 provides sufficient pressure for transmission operation and to charge the accumulator 121, mainline 23 is connected through priority valve 154 for fluid flow through accumulator supply line 149, retarder valve 142, between lands 144a and b, to accumulator line 151 and port 152, to charge accumulator 121. In brake ON position, accumulator supply line 149 is blocked by land 144a and accumulator line 151 is connected to discharge accumulator 121 to retarder inlet line branch 156 and retarder inlet line 157. In brake OFF position, both retarder inlet line branch 156 and retarder inlet line 157 are blocked between lands 144a and b. In brake ON position, the cooler 164 outlet line 158 is connected between lands 144b and c to retarder inlet line 157 and in brake OFF position, is connected between lands 144c and d to lubrication line 159 which is connected to the transmission lubrication system which includes lubrication passage 52 and may have a known pressure relief valve (not shown) regulating lubricant pressure at a low value less than converter outlet pressure. In brake OFF position, cooler outlet line 158 is connected by a restriction 162 between lands 144b and c to retarder inlet line 157 to provide a low volume lubrication and cooling flow of fluid to the friction brake 110. Converter outlet line 27, in the brake ON position, is connected between lands 144c and d to lubrication line 159 and, in the brake OFF position, is connected between lands 144d and e to cooler inlet line 163 for flow through cooler 164, with a low pressure drop, to cooler outlet line 158. Retarder outlet line 166, in the brake ON position, is connected between lands 144d and e to cooler inlet line 163 and, in the brake OFF position, is connected beyond land 144e to exhaust port 167.

Retarder inlet line 157 has a regulating branch 168 connected to 2nd regulator valve 143, as described below. Friction brake apply line 170 is connected to 1st regulated pressure chamber 169 at the end of bore 146 so that regulated 2nd supply or friction brake apply pressure acts on the free end area of land 144e to bias valve element 144 in a pressure decreasing direction and excess pressure fluid is regulated to exhaust port 167. A first spring 171, seated between the end wall 172 of bore 146 and land 144e, also biases valve element 144 in a pressure decreasing direction.

Retarder valve 142 also includes a regulating element 173, having a land a of smaller diameter than the lands of valve element 144, and being slidably mounted in a small coaxial bore 174, connecting with larger bore 146 and closed at the opposite end by cover 176 and having a 2nd regulated pressure chamber 177. Full-flow connecting passage 178 in regulating element 173 connects 1st and 2nd regulated pressure chambers 169 and 177. 2nd regulator valve 143 is an overlapped regulator valve and the flow requirements for regulating retarder inlet pressure in retarder inlet line 157 are low so that the regulated 2nd supply or friction brake apply pressure supplied to friction brake apply line 170 is in 1st and 2nd chambers 169 and 177 and acts on opposite ends of regulating element 173 so that it is a fluid pressure balanced valve element. A second spring 179, seated on cover 176, biases regulating element 173 so that abutment 181 on regulating element 173 engages a stop 182 on retarder valve element 144, especially in regulating brake ON position. Second spring 179 has a free height, so regulating element 173 only engages main valve element 144 in brake ON position but may have a higher free height and maintain light contact in brake OFF position. The distance between land 144e and land 173a is slightly less, a small underlap, as compared to the distance between exhaust port 167 and supply port 183 for regulation to decrease regulated pressure by connecting chamber 169 to exhaust port 167, and to increase or decrease regulated pressure by connecting supply port 183 to chamber 169, depending on whether supply port 183 is supplied with fluid pressure or exhausted by 2nd regulator valve 143. Chamber 169 is connected to supply 2nd regulated supply pressure directly to friction brake apply line 170 and, via connecting passage 178 through regulating valve element 173, 2nd regulated pressure chamber 177, connecting feed line 195 to 2nd regulator valve 143 which regulates 3rd regulated supply pressure to connecting supply line 189, regulating branch 168 and retarder inlet line 157.

The 2nd regulator valve 143 has a regulator valve element 186 having equal-diameter lands a, b, and c, slidable in a bore 187. Lands 186b and c, although forming one land, are identified separately because land c may have a larger diameter, as shown in FIG. 3 and for operation as described below. The governor 19, driven by transmission output shaft 16 or brake shaft 17, delivers governor pressure proportional to output or brake speed to governor line 20. Governor line 20 is connected to the transmission control 25 and to governor chamber 190 at the closed end of large bore 188 to act on land 186c with spring 193, so both bias 2nd regulator valve element 186 in a pressure increasing direction for connecting 2nd supply line 195 to connecting 3rd supply line 189 and retarder inlet branchline 168. Second regulator valve 143 has a closed chamber 191 located at the opposite end of small bore 187 and connected at all times by central passage 192 in valve element 186, the groove between lands 186a and b and connecting 3rd supply line 189 to retarder inlet regulating branchline 168, to provide regulated 3rd supply or retarder inlet pressure in closed chamber 191 biasing valve element 186 to decrease pressure by connecting 3rd supply line 189 to exhaust 194.

The required retarder inlet pressure for maximum retarder torque capacity (Curve 234) to peak pressure (point 233, FIG. 5), provides the maximum retarder torque capacity which similarly increases with speed. Second regulator valve 143 regulates the 3rd supply or retarder inlet pressure in a low speed range (Curve 231, FIG. 5), from zero to a moderate transition speed (T), e.g., 0 to 800 RPM, or 0 to 18 MPH of a vehicle; from a minimum or low value (point 232) to a peak maximum pressure value (point 233), e.g., 15 to 50 psi. In the low speed range, since 1st regulator valve 200 supplies a higher 1st regulated supply pressure via 1st regulated supply pressure line 212 and supply port 183 to retarder valve 142, and when retarder valve 142, at high brake demand, regulates a higher 2nd supply pressure (Curve 240) supplied via passage 178 and line 195 to 2nd regulator valve 143, the 2nd regulator valve 143 regulates 3rd supply pressure (Curve 231) over its full range of pressure values. At full brake demand, in the higher speed range, from transition speed to maximum speed (e.g., 800 to 2400 RPM), 2nd regulator valve 143 connects, without regulation, the lower pressure value 2nd regulated pressure (Curve 236) to retarder inlet regulating branchline 168. At full brake demand and transition speed (T), between the low speed range where retarder inlet pressure is regulated by 2nd regulator valve 143 and the high speed range where retarder inlet pressure is regulated by 1st regulator valve 200, the retarder inlet pressure and torque have the maximum value.

The 1st regulator valve 200 has a valve element 201 having small equal diameter lands 201a and b in small bore 202, and larger diameter land c in larger diameter large bore 203. The space between valve lands 201a and b is always connected by passage 204 in valve element 201 to closed chamber 206 at the outer end of small bore 202 to bias valve element 201 in a pressure decreasing direction. A spring 207 is seated on seat member 208 secured at the outer end of large bore 203, guided in large bore 203, and engages land 201c and biases valve element 201 in a pressure increasing direction. Exhaust 209 vents large bore 203 in the spring chamber portion beyond large diameter land 201c. Governor pressure line 20 is connected at the step 211 between adjacent ends of bores 202 and 203 to act on the unbalanced area of lands 201c and b (the area of large land 201c minus the area of small land 201b), to bias valve element 201 in a pressure decreasing direction. The 1st regulated supply pressure line 212 is always connected between lands 201a and b, and selectively connected to mainline 23 to increase 1st regulated supply pressure, and connected to exhaust 213 to decrease 1st regulated supply pressure. The 1st regulator valve 200 regulates 1st regulated supply pressure (Curve 236, FIG. 5) from a maximum pressure value (point 237), e.g., 60 psi, at zero speed, and decreasing pressure values with increasing speed through peak value (point 233), e.g., 50 psi, to reduce friction brake apply pressure in the low speed range, and then to an intermediate pressure value (point 238), e.g. 20 psi, at maximum speed to reduce retarder brake pressure with increasing speed in the high speed range.

The retarder control 141, in brake ON position, regulates retarder inlet pressure, via retarder inlet branch-line 168, in retarder inlet line 157 at a pressure value equal to the lower pressure value of a pressure value proportional to brake demand signal supplied by brake demand line 137; and in the lower speed range, the pressure value of 1st regulated supply pressure increasing with speed; and, in the higher speed range, to the pressure value of 2nd regulated supply pressure decreasing with speed.

Figure 5:
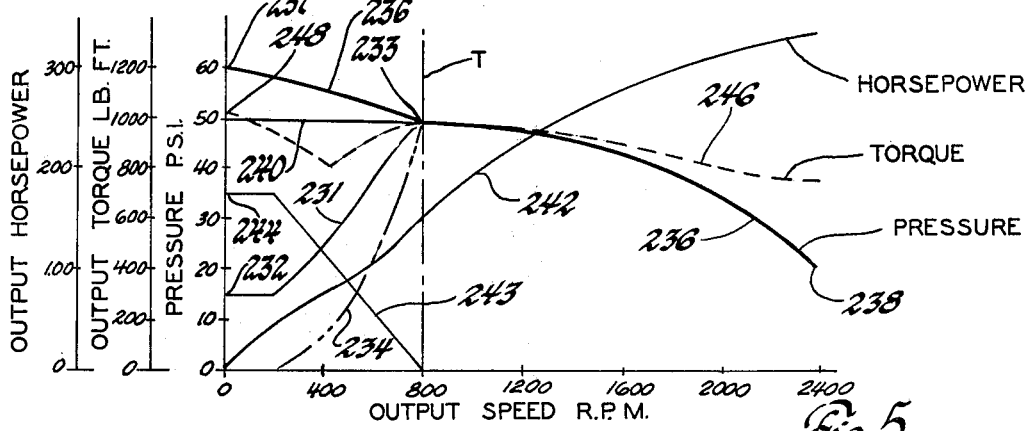
FIG. 5 shows pressure, torque, and power curves plotted relative to speed for the FIG. 2 embodiment at full brake demand.
Figure 6:
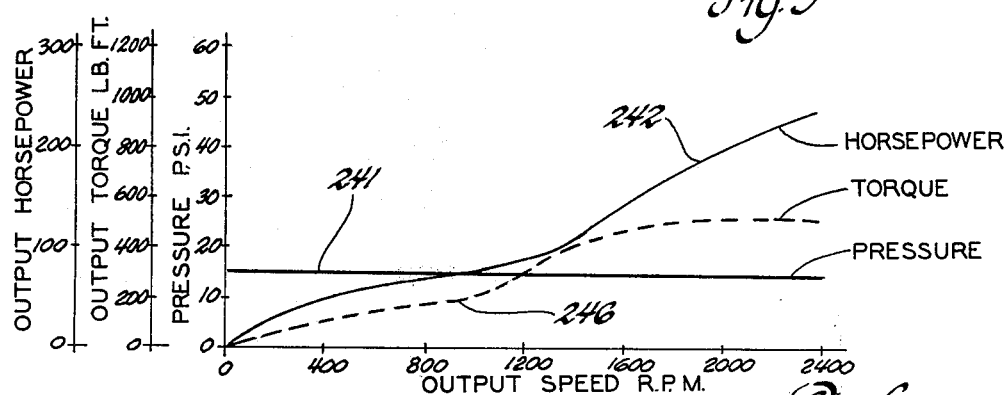
FIG. 6 shows pressure, torque, and power curves plotted relative to speed for the FIG. 2 embodiment at a partial brake demand.

As shown in FIG. 5, retarder inlet pressure has limit values at maximum brake demand, at each speed increasing with speed in the low speed range (curve 231) from zero to the transition speed (e.g., 800 rpm) from a minimum pressure value, point 232, (e.g., 15 psi) to the maximum or peak pressure value, point 233, (e.g., 50 psi), and decreasing with speed in the high speed range from the transition speed to maximum speed (curve 236) from the peak pressure value (point 233) to an intermediate limit pressure value, point 238, (e.g., 20 psi). These limit pressure values are determined by the regulated supply pressures. As brake demand pressure increases from the switching value to maximum pressure (e.g., 15 to 65 psi), retarder inlet pressure is increased in proportion to brake demand from a minimum to the maximum pressure limit value (e.g., 0 to 50 psi), and at other speeds is increased in the same proportion up to the lower of the brake demand proportional value and limit value at each speed.

OPERATION OF FIRST EMBODIMENT

The operation of the brake system and the components thereof will now be summarized. When the driver or vehicle operator moves driver pedal 136 (FIG. 2a) from off position to on position to increase brake demand to a maximum on the brake unit 10, the brake regulator valve 134 is controlled to provide brake demand air pressure increasing in proportion to brake demand in brake demand line 137.

Brake unit 10 is used with a conventional automatic powershift transmission 11 which provides a high fluid pressure source 18 to mainline 23, and an output or retarder speed governor pressure in governor line 20, for use in the transmission 11 and brake unit 10. The engine, when running, drives input shaft 12 and pump 21 to supply fluid under pressure to mainline 23 which is regulated at a high pressure (e.g., 100 psi or higher) by main regulator valve 24 and connected to provide regulated high fluid pressure source 18 for transmission control 25 and retarder control 141 to charge the fluid accumulator 121 and provide a regulated supply pressure. Main regulator valve 24 connects first overage to converter supply or inlet line 26 regulated by converter relief regulator valve 28 at an intermediate regulated pressure (e.g., 32 to 52 psi) to supply torque converter 13. Converter outlet line 27 is regulated by relief regulator valve 29 at a lower regulated pressure (e.g., 23 to 30 psi), and thus provides a regulated low fluid pressure source connected by retarder valve 142 either directly or through cooler 164 to transmission lubrication line 159. Conventional transmission 11 is thus fully operative in response to driver control of transmission control 25 to drive the output and brake shafts 16 and 17 which are drive-connected to a load, such as a vehicle drive. Brake unit 10 is also operative in response to driver control of driver pedal 136.

With the driver pedal 136 in brake OFF position, brake demand line is exhausted and has zero air pressure, so air chamber 147 is exhausted permitting first spring 171 to move retarder valve element 144 of retarder valve 142 to the brake OFF position. The retarder valve 142, in brake OFF position, connects mainline 23, via priority valve 154 and fluid accumulator supply line 149 between lands 144a and b, to accumulator line 151 and port 152, to charge chamber 120 of fluid accumulator 121, moving piston 128 to the charged position shown in FIG. 2b. Retarder valve 142, in the brake OFF position, connects converter outlet line 27 between valve element lands 144d and e to cooler inlet line 163 for loop circuit flow through cooler 164 and cooler outlet line 158 which is connected between lands 144c and d to transmission lubrication line 159 to lubricate transmission 11. Retarder valve 142, in brake OFF position, in cooperation with second regulator valve 143, exhausts both the retarder inlet line 157 and retarder outlet line 166 and retarder pumping action will quickly evacuate inner brake chamber 68 and retarder chambers 88 and 89, so there is no retarder torque. The main retarder exhaust flow is from retarder outlet line 166 through retarder valve 142 to exhaust 167. Retarder inlet line 157 also is connected via its regulating branch 168 to second regulator valve 143 for connection to exhaust 194; or through this valve 143 and via connecting line 195 and passage 178 to 1st chamber 169 and exhaust port 167. Check valve 65 permits air to enter the brake unit 10 to permit rapid exhaust of fluid.

Cooler outlet line 158, in brake OFF position, is also connected through the restriction 162 between the lands 144b and c and through retarder inlet line 157 and inner brake chamber 68 to lubricate and cool friction brake 110 to reduce drag without sufficient volume of fluid-flow for even a partial fill of retarder chambers 88 and 89, so there is no retarding.

To provide braking by brake unit 10, the driver moves driver pedal 136 from brake OFF position through positions of increasing brake demand to full or maximum brake ON position to control brake regulator valve 134 to supply regulated brake demand pressure increasing with brake demand (e.g., 0 to 65 psi). The conventional brake regulator valve 134 resists driver control with a force proportional to brake demand for "feel" and returns pedal 136 to OFF position. At a predetermined low initial brake demand switching pressure (e.g., 15 psi), retarder valve 142 is moved or switched from brake OFF position to the brake ON regulating position connecting accumulator 121 to fill the retarder circuit for retarding to initiate operation of brake unit 10.

The low initial brake demand switching pressure, connected by brake demand line 137 to air chamber 147, switches retarder valve element 144 against first spring 171, and retarder valve regulating element 173 against second spring 179, to the brake ON regulating position of retarder valve 142 shown in FIG. 2a to provide switching, changing the connections from the above-described brake OFF position connections to the following brake ON position connections.

Converter outlet line 27 is connected between lands 144c and d directly to the transmission lubrication line 159, thus bypassing cooler 164 so the full capacity of cooler 164 is available for retarder fluid cooling. Accumulator supply line 149 is blocked by the land 144a. Accumulator line 151 is connected between lands 144a and b to retarder inlet branch 156 and line 157 to fill the loop circuit, including inner brake chamber 68 and retarder chambers 88 and 89. Retarder valve 142 establishes the loop circuit having in the order of fluid flow: retarder inlet line 157, inner brake chamber 68, grooves 113 in intermediate brake plates 112 providing a restricted passage through friction brake 110, retarder chambers 88 and 89 where the fluid is pumped for flow through retarder outlet line 166, between lands 144d and e, through cooler inlet line 163, cooler 164, cooler outlet line 158, and between lands 144b and c to retarder inlet line 157 to complete the loop circuit. Friction brake apply line 170 is connected to 1st regulating chamber 169 for regulation by retarder valve 142, due to the combined regulating action of retarder valve element 144 and regulating element 173. In the pressure regulating position of retarder valve 142 (FIG. 2a), brake demand pressure in air chamber 147 acting on the full end area of land 144a, biases main valve element 144 and regulating element 173 in a pressure increasing direction by opening supply port 183 to feed 1st regulating supply pressure to 1st regulating chamber 169. The pressure decreasing bias force is provided by 2nd regulated supply pressure, which is friction brake apply pressure, in 1st regulating chamber 169 acting on the full end area of land 144e, first spring 171 acting directly on main valve element 144, and second spring 179 acting through regulating element 173 on valve element 144 to open exhaust 167. Central passage 178 through regulating element 173 provides balanced 2nd regulated supply pressure on both ends of regulating element 173 so that it does not provide a fluid pressure bias force. The 1st regulator valve 200 is supplied by mainline 23, and is controlled in response to governor pressure provided by governor pressure line 20 to regulate 1st supply pressure in 1st supply line 212 and supply port 183 at a 1st supply pressure (Curve 236, FIG. 5) decreasing from a maximum pressure value (point 237) at zero speed in proportion to increasing speed through peak pressure (point 233) to an intermediate pressure value (point 238) at the maximum speed.

This 1st supply pressure is inversely similar and proportional to a typical two-weight governor conventionally used to provide a single-step governor pressure curve to approximate a straight line relation between speed and pressure. The retarder valve 142 is fed with 1st supply pressure and regulates 2nd supply pressure from zero to a peak maximum value (point 233) as brake demand air pressure increases from the low switching value to maximum pressure value, when 1st supply pressure is at least as high in the low speed range. When 1st supply pressure has lower values, the highest 2nd supply pressure is limited to the 1st supply pressure value. Thus, at low intermediate brake demand values, (Curve 241, FIG. 6), the 2nd supply pressure has a constant intermediate value, e.g., 15 psi.

In the low speed range, 2nd supply pressure (Curve 240) is fed to friction brake apply line 170 and 2nd regulator valve 143 which regulates, at full brake demand, 3rd supply or retarder inlet pressure (Curve 231, FIG. 5), varying from a low value (point 232), e.g., 15 psi, up to the peak value (point 233), e.g., 50 psi, as speed increases from zero to the transition speed (T). This retarder inlet pressure exceeds the required retarder inlet pressure (Curve 234) to provide maximum retarder torque capacity at lower speeds in the low speed range for rapid fill, increased cooling flow, and reduced braking by friction brake 110. At higher speeds in the low speed range, retarder inlet pressure (Curve 234) approaches the required retarder inlet pressure and has about the same peak pressure value (point 233). At full brake demand in the high speed range, 2nd regulator valve 143 is open and connects 2nd supply pressure (Curve 236) to retarder inlet line 157. In the high speed range, since 2nd supply pressure (Curve 236) decreases from the peak pressure value (point 233) to the intermediate pressure value (point 238) in the high speed range, retarder torque similarly decreases and retarder power only moderately increases. In the high speed range, since friction brake 110 is off, the retarder torque and power provide the total torque (Curve 246) and power (Curve 242).

In the low speed range, since 2nd supply pressure (Curve 240) provides friction brake apply pressure, and 3rd supply pressure (Curve 231) provides retarder inlet pressure and friction brake release pressure, the differential or net friction brake apply pressure (Curve 243) is the apply pressure minus the release pressure. During initial brake demand, the restricted port 105 in piston 107 delays the increase of friction brake apply pressure in cylinder 108 so friction brake apply motor 109 does not apply friction brake 110 before regulated retarder inlet pressure is supplied via inner brake chamber 68 and through brake 110 to retarder 72, to cool brake 110 and provide regulated brake release pressure on piston 107 of apply motor 108. The friction brake net apply pressure decreases from a maximum pressure value (point 244) less than the peak pressure value (point 233) and decreases with increasing speed to zero at the transition (T) speed. Since friction brake torque is higher relative to net apply pressure than retarder torque is relative to retarder pressure and decreases inversely relative to increasing retarder torque as speed increases, friction brake torque decreases from a maximum value equal to total torque at zero speed to zero torque at the transition speed (T) and higher speeds. Thus total torque (Curve 246) has a maximum value (point 248) at zero speed provided only by friction brake torque, decreases a small amount and then increases in the low speed range to retarder torque at transition speed (T) since friction brake torque decreases in direct proportion to decreasing net apply pressure which decreases in a quite straight line relation with speed and retarder torque increases more exponentially relative to speed and then decreases in the high speed range. Thus total power (Curve 242) increases in an approximate straight line relation with speed.

At partial brake demand values, the retarder valve 142 proportionally reduces or limits the 2nd supply pressure value so both the friction brake apply pressure and retarder inlet pressure values are reduced or limited. At higher partial brake demand, as speed increases from zero to maximum speed, retarder inlet pressure increases on Curve 231 to the limit pressure value and then decreases on Curve 236. In the low speed range, since friction brake apply pressure is reduced and retarder inlet or friction brake release pressure is not reduced, the net friction brake apply pressure is reduced to a greater degree. Thus total torque in the low speed range is low at zero speed and increases at a lower rate and merges with retarder torque and then at higher speed, decreases with decreasing 1st supply pressure. At a low partial brake demand, 2nd supply pressure, retarder inlet pressure, and friction brake apply pressure has a low constant pressure value (Curve 241, FIG. 6), and net friction brake apply pressure is zero, so there is only lower retarder braking providing lower total torque (Curve 256) and total power (Curve 257), both moderately increasing in an approximate straight line relation with speed.

FIRST MODIFICATION

The first modified brake unit 10' shown in FIG. 3 is similar to the above-described brake unit 10 shown in FIGS. 2a and 2b for the first construction, so the same reference numerals (primed) have been used for similar parts and also the curves in FIGS. 7 and 8, in the following description which points out similarities with reference to the above description of brake unit 10 and the different structure and function of similar parts having primed reference numerals and added parts having additional reference numerals.

The brake unit 10' is similarly combined with transmission 11 to provide a transmission and brake assembly 9', so the mainline source 18' supplying mainline 23', governor 19' supplying governor pressure line 20', converter outlet line 27' and lubrication line 159' of transmission 11 are diagrammatically shown in FIG. 3. The brake unit 10' has a similar brake subassembly 15', as shown in FIG. 2b, with retarder 72', friction brake 110', brake apply fluid motor 109' and fluid accumulator 121'. The accumulator 121' is air pressure-biased rather than spring-biased to discharge. The brake unit control 130' has the same air supply 131' and regulator valve 134' supplying brake demand air pressure regulated in proportion to brake demand to brake demand line 137' which is connected to similar retarder valve 142', and in this modification also to a friction brake control valve 216 and to fluid accumulator 121' to provide the discharge bias force. Modified retarder valve 142' is the same as preferred retarder valve 142 except that preferred roll form diaphragm seal 150' is used and connecting passage 178' in regulating valve element 173' is smaller than passage 178 as it is used for pressure balancing and damping flow between 1st and 2nd chambers 169' and 177'. The same lines are connected in the same manner except as follows: 1st regulated pressure chamber 169' is connected to retarder inlet branchline 168' rather than to friction brake apply line 170', and the connections of the 1st and 2nd regulator valves 200' and 143' to supply port 183' are changed, as described below.

Modified and first embodiment 2nd regulator valves 143' and 143 are similar except that modified 2nd regulator valve 143' has spring 193' in chamber 191' having 3rd supply pressure and acting in a pressure-decreasing direction. Also, land 186'c is larger than land 186'b and is seated in larger bore 188', requiring exhaust 196' at the step between bores 187' and 188'. The ratio of the diameters of land 186'c to land 186'a is larger than of land 186c to land 186a. Thus first modified 2nd regulator valve 143' provides zero regulated pressure at a very low speed and pressure increasing at a higher rate with speed (Curve 231', FIG. 7), while first embodiment 2nd regulator valve 143 provides a low pressure value (e.g., 15 psi) at zero speed and pressure increasing with speed at a lower rate (Curve 231, FIG. 5). Both 2nd regulator valves 143' and 143 provide a similar peak maximum pressure (points 233 and 233') at a transition speed (T, T', FIGS. 5, 7) for maximum retarder torque at maximum torque capacity.

In this FIG. 3 modification, 1st regulator valve 200' is the same as 1st regulator valve 200 in the first construction. In the supply system of this modification, the mainline 23' is connected to feed 1st regulator valve 200' which, in response to governor pressure in governor pressure line 20', a retarder speed signal, provides a 1st regulated supply pressure in 1st regulated pressure supply line 212', varying from a maximum pressure value, e.g., 50 psi (point 237' of Curve 236', FIG. 7), through peak pressure, e.g., 40 psi (point 233'), to an intermediate value, e.g., 12 psi (point 238'), at maximum speed similar to the first embodiment. The 1st regulated supply pressure line 212' is connected via 2nd supply or connecting feed line 195' directly to 2nd regulator valve 143' which, in response to governor pressure supplied by governor pressure line 20', supplies 2nd regulated supply pressure (Curve 231', FIG. 7) to 3rd connecting supply port 189' and 3rd supply line 197' to supply port 183' of retarder valve 142'. The brake demand line 137' is connected by the friction brake control valve 216 to the friction brake apply line 170' which is connected to the apply chamber of friction brake apply motor 109'. The friction brake control valve 216, in response to governor pressure supplied by governor pressure line 20' in the high speed range from the transition speed to maximum speed, operates to reduce friction brake apply pressure, preferably to zero but at least to a pressure value equal to or less than retarder inlet pressure which acts as a friction brake release pressure to release the friction brake 110'. The friction brake control valve 216 is a switching valve which in the low speed range, as shown, connects brake demand line 137' to friction brake apply line 170' and, at and above the transition speed (T2, FIG. 7), blocks friction brake demand line 137' and connects friction brake apply line 170' to exhaust 217 to exhaust the apply chamber of friction brake apply motor 109' and to release friction brake 110'.

FIRST MODIFICATION OPERATION

At zero brake demand, air brake regulator valve 134' provides zero brake demand air pressure in brake demand line 137', so friction brake 110' is released and 1st spring 171' positions main retarder valve element 144' of retarder valve 142' in retarder OFF position, as shown in FIG. 3. In this first modification, retarder valve 142' is similar to the first embodiment retarder valve 142 and establishes similar connections in retarder OFF and ON positions. In retarder OFF position, retarder valve 142' similarly connects converter outlet line 27' to the cooler loop circuit, cooler inlet line 163', cooler 164', and cooler outlet line 158' which is connected by retarder valve 142' to lubrication line 159' and to restriction 162', and retarder inlet line 157' to lubricate friction brake 110'. Retarder outlet line 166' and modified retarder inlet regulating branchline 168' are connected via 1st regulated pressure chamber 169' to exhaust 167', so there is no biasing pressure and to empty retarder 72' so there is no retarding. Mainline 23', at pressures sufficient for operation of the transmission 11, is similarly connected by priority valve 154', accumulator supply line 149', retarder valve 142', and accumulator line 151' to charge accumulator 121' against zero bias force, as the torque demand pressure used for accumulator bias force has a zero pressure value. Regulating element 173' blocks supply port 183' to block the feed of 2nd supply pressure.

On initial brake demand, a low brake demand switching pressure (e.g., 15 psi), in air chamber 147', overcomes 1st and 2nd springs 171' and 179' to move or switch retarder main valve element 144' to retarder ON position, so retarder valve 142' establishes the following connections. Accumulator line 151' is connected to retarder inlet branchline 156' and inlet line 157' so accumulator 121', under air pressure bias force, discharges fluid to fill the brake unit 10' and retarder controls 141'; retarder outlet line 166' is connected through cooler 164' and returned to retarder inlet line 157'; accumulator supply line 149' is blocked; and converter outlet line 27' is connected to lubrication line 159' for operation of transmission 11.

In the retarder ON position, retarder valve 142' regulates retarder inlet pressure from zero up to the value of 2nd supply pressure supplied to supply port 183' proportional to brake demand as it increases from the switching pressure value to a maximum pressure value. The 2nd spring 179' holds regulating element 173' in contact with retarder main valve element 144' during regulation. Retarder inlet line 157' is connected by its regulating branchline 168' to 1st regulated pressure chamber 169', so retarder inlet pressure acts on the end area of land 144'e in the same direction as 1st and 2nd springs 171' and 179' to close supply port 183' and open exhaust 167' for regulation to reduce retarder inlet pressure; and brake demand air pressure acts on land 144'a to bias main valve and regulating elements 144' and 173' in the opposite direction to close exhaust 167' and open supply port 183' to 1st regulated pressure chamber 169' for regulating increasing retarder inlet pressure proportional to increasing brake demand, up to the 2nd supply pressure value which varies with speed. The 1st or high speed and 2nd or low speed regulator valves 200' and 143' are connected in series in that order, to supply port 183'.

Figure 7:
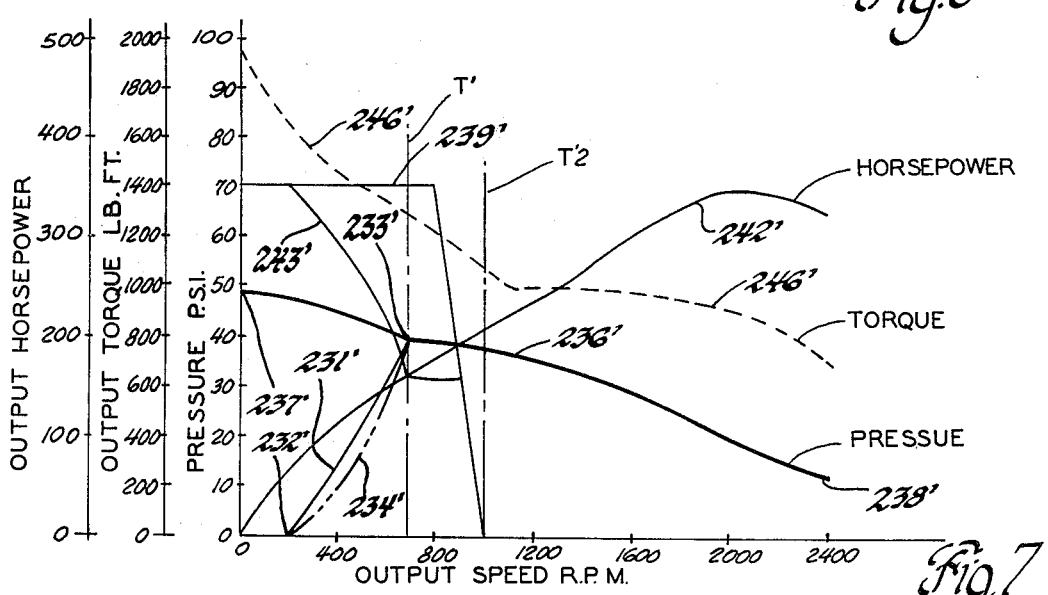
FIG. 7 shows pressure, torque, and power curves plotted relative to speed for the first modification, FIG. 3, at full brake demand.
Figure 8:
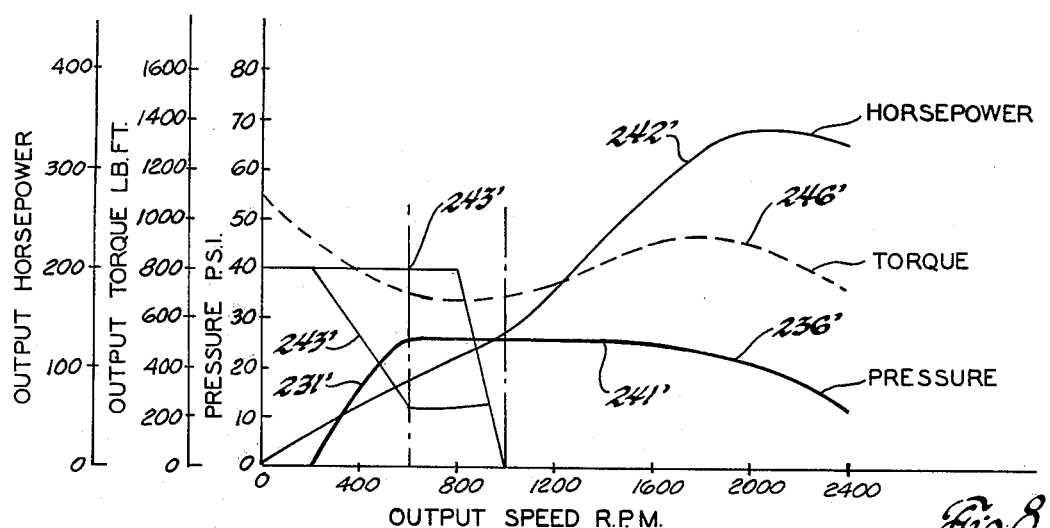
FIG. 8 shows pressure, torque, and power curves plotted relative to speed for the first modification, FIG. 3, at a partial brake demand.

As shown by the curves of FIG. 7, 1st regulator valve 200' regulates a 1st supply pressure (Curve 236'), decreasing from a maximum pressure value (point 237'), through a peak pressure value (point 233'), to an intermediate pressure value (point 238'), over the full speed range, from zero to maximum speed. The 2nd regulator valve 143' is fed by 1st supply pressure and in the low speed range, regulates 2nd supply pressure (Curve 231', FIG. 7) at a low speed (point 232') from zero to the same peak pressure value (point 233') as the 1st supply pressure value at the transition speed (T'). 2nd supply pressure (Curve 231') increases with increasing speed in the low speed range to provide or match the required retarder inlet pressure (Curve 234') for maximum capacity retarder torque, so the retarder provides the maximum torque capacity with increasing speed up to a predetermined retarder torque. Then, in a high speed range, from transition (T') speed to maximum speed, the 2nd regulator valve 143' is open and 2nd supply pressure, regulated by 1st regulator valve 200', decreases from the peak pressure value (point 233') to an intermediate pressure value (point 238'). At full (100%) brake demand, retarder valve 142' connects 2nd supply pressure (Curve 231') increasing in the low speed range and (Curve 236') decreasing in the high speed range, to provide retarder inlet pressure, to retarder torque varies with speed in a similar manner.

In a second larger low speed range and at full brake demand, friction brake control valve 216 connects brake demand air pressure at the maximum value, e.g., 70 psi (Curve 239') from zero speed nearly to a second slightly higher transition speed (T2), via brake demand line 137' and friction brake apply line 170', to the apply chamber of friction brake apply fluid motor 109'. Retarder inlet pressure, supplied by retarder inlet line 157' to brake unit 10', acts in a release direction on fluid motor 109'. So friction brake 110' is applied by the friction brake net apply pressure (Curve 243'), brake demand pressure minus retarder inlet pressure. At full brake demand in second low speed range (T2), since brake demand pressure has a constant maximum pressure value (Curve 239') and retarder inlet pressure (Curve 231') increases with increasing speed, the net apply pressure (Curve 243') decreases with increasing speed inversely proportional to retarder inlet pressure which increases with increasing speed. Net brake apply pressure (Curve 243') has a constant maximum value, e.g., 70 psi, when retarder inlet pressure (Curve 231') is zero, from 0 to 200 RPM, decreases to an intermediate value, e.g., 31 psi, as retarder inlet pressure increases to peak pressure value (point 233') at 1st transition speed (T'), and then increases at a low rate as retarder inlet pressure decreases at a low rate from 1st to 2nd transition speeds, T' to T'2. At the second transition speed (T'2), friction brake control valve 216, in response to governor pressure, exhausts friction brake apply line 170', so friction brake 110' is positively released by retarder inlet pressure at speeds above second transition speed (T'2) in the high speed range. As shown by the slope of Curve 239', brake apply air pressure in friction brake apply line 170' changes (increases or decreases) over a short time period during which speed will normally change. Although the operation is generally discussed relative to increasing speed, this sloped portion of Curve 239' is shown for the more normal brake operation with increasing brake apply pressure and decreasing speed. Friction brake torque values linearly with net apply pressure. In the high speed range above first transition speed (T'), since retarder inlet pressure (Curve 236') at full brake demand decreases from a peak maximum pressure value (point 233') to an intermediate pressure value (point 238') with increasing speed, retarder torque similarly decreases. Thus at full brake demand, total torque (Curve 246') has a maximum value about equal to friction brake torque from 0 to 200 RPM where retarder torque is essentially zero. Then, as retarder inlet pressure and torque increase and friction brake net apply pressure and torque decrease, and because net friction brake apply pressure provides a relatively higher friction brake torque than the retarder torque provided by the same pressure value of retarder inlet pressure, the total torque decreases from 200 RPM to first transition speed (T'). Then total torque decreases to retarder torque as speed increases from the first to the second transition speeds (T' to T'2). In the high speed range above second transition speed (T'2), total torque decreases with increasing speed at a rate a little lower than the rate of decrease of retarder inlet pressure. Total brake power (Curve 242') only increases moderately and in an approximate straight line relation with increasing speed. As brake demand decreases, retarder valve 142' decreases the maximum retarder inlet or peak pressure (point 233'). The 1st and 2nd regulator valves 200' and 143' always supply 2nd supply pressure increasing in the low speed range (Curve 231') to peak pressure value (point 233'), and decreasing in the high speed range (Curve 236') with increasing speed to retarder valve 142'. So 2nd supply pressure determines the highest available pressure value or limit pressure value of retarder inlet pressure at each speed and has a peak maximum pressure value (point 233') at the transition speed (T'). As break demand increases from the switching value to maximum value, the retarder inlet pressure has an increasing limit value. Thus at a partial brake demand, e.g., 40 psi air pressure, retarder valve 142' limits retarder inlet pressure to a partial value, e.g., 25 psi, (Curve 241', FIG. 8); 2nd regulator valve 143' at low speeds limits retarder inlet pressure to lower values on Curve 231'; 1st regulator valve 200' at high speeds limits retarder inlet pressure to lower values on Curve 236'. This reduced retarder inlet pressure provides a similarly reduced retarder torque. At this partial brake demand, net apply pressure (Curve 243') is reduced and friction brake torque similarly reduced.

So, at this partial brake demand, total torque (Curve 246', FIG. 8) decreases in the low speed range and increases and decreases in the high speed range for moderately increasing brake power (Curve 242') approximating a straight line relation with speed.

SECOND MODIFICATION

Figure 4:
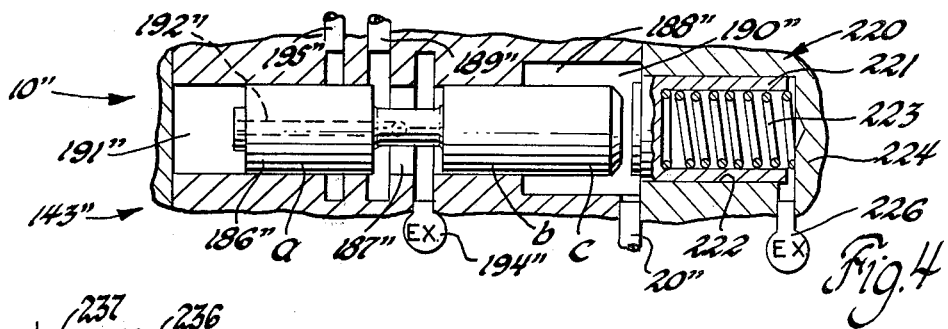
FIG. 4 shows a second and now preferred modification of the low speed regulator valve.
Figure 9:
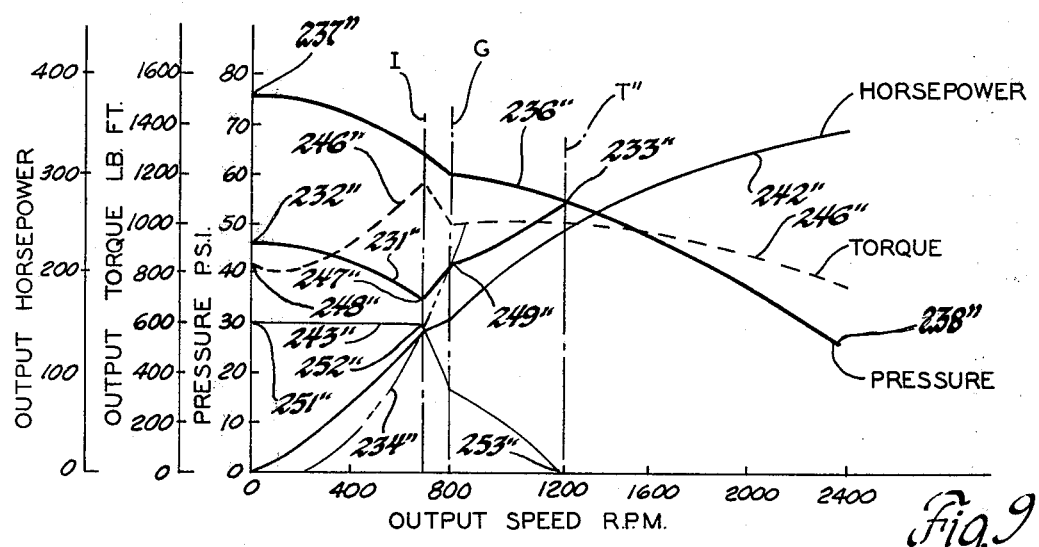
FIG. 9 shows pressure, torque, and power curves plotted relative to speed for the second modification, FIG. 4, at full brake demand.

The presently preferred second modified brake unit 10" is like the first embodiment brake unit 10 and also used with transmission 11 as shown in FIG. 2, but has a modified 2nd or low speed regulator valve 143" shown in FIG. 4. Reference is made to the above description of the first embodiment and FIG. 2 with regard to similar portions of this second modification of the brake unit 10" and 2nd or low speed regulator valve 143" and to the following description of modified portions. Double-primed numerals are used and shown for the same-numbered components (FIG. 4) and for the curves, points, values, etc., of FIGS. 9 and 10.

This second modified low speed regulator valve 143" has a valve element 186" with equal-diameter lands a, b, and c, in valve bore 187". Since lands 186"b and c have the same diameter, they are portions of the same land, but since they function like lands 186b and c in FIGS. 2a and 3, the same nomenclature is used. Land 186"c has the same diameter as land 186"b, as in FIG. 2a, to reduce the rate of increase of 3rd supply or low speed regulated pressure relative to increasing governor pressure and speed. Thus low speed regulator valve 143", valve element 186" and bore 187" have the same connections for 2nd regulated supply connecting feed line 195", 3rd regulated supply connecting supply line 189", exhaust 194", governor pressure chamber 190", and regulated pressure chamber 191", as in 2nd or low speed regulator valve 143 (FIG. 2a).

The added governor-controlled spring biasing assembly 220 has a piston 221 slidable in a bore 222 which is coaxial with valve bore 187". Piston 221 has a larger diameter than land 186"c. Spring 223, seated on the end 224 of bore 222, biases piston 221 toward governor pressure chamber 190" and land 186"c. Exhaust 226 vents piston bore 222 on the spring side of piston 221.

SECOND MODIFICATION OPERATION

The operation of this second modification (FIG. 4) is like the first embodiment (FIG. 2), except for the modified pressure regulation by retarder valve 142" and 2nd regulator valve 143" having biasing spring assembly 220. The 2nd or low speed regulator valve 143" is fed with 2nd regulated supply pressure by connecting feed line 195" and delivers 3rd regulated supply pressure to connecting supply line 189" to regulate retarder inlet pressure, as in the FIG. 2 first embodiment, but regulates a higher retarder inlet pressure (Curve 231", FIG. 9) to provide substantially constant lower friction brake net apply pressure (Curve 243") in the lower portion of the low speed range. In the low speed range at full (100%) brake demand (e.g., 90 psi brake demand pressure), at zero speed and no governor pressure, spring 223, through piston 221, exerts its maximum biasing force on valve element 186" to provide a zero-speed intermediate pressure value (point 232") of 3rd regulated supply or retarder inlet pressure (Curve 231"). As speed increases in the lower portion of the low speed range, increasing governor pressure acting on piston 221, decreases the bias force of spring 223 at a higher rate than the increasing bias force of governor pressure acting directly on the land 186"c to provide a net decrease of bias force, so 3rd supply pressure (Curve 231"), from zero speed to intermediate speed (I), decreases to a minimum value (point 247") at the same rate as 1st and 2nd supply pressure (Curve 236"), so the net friction brake apply pressure (Curve 243") is substantially constant from zero speed to intermediate (I) speed (points 251" to 252"). At intermediate speed (I) in the low speed range, governor pressure overcomes spring 223 to discontinue the spring bias force, and the governor pressure, acting directly on land 186"c, provides the bias force to increase 3rd supply pressure (Curve 231") with increasing speed from an intermediate speed (I) minimum pressure value (point 247") at a high rate to (point 249") at the governor step (G) of governor 19 and then at a lower rate to peak pressure (point 233") at transition speed (T"). Thus, from intermediate speed (I) to governor step speed (G), net brake apply pressure (Curve 243") decreases at a high rate, and from governor step speed (G) to transition speed (T"), net brake apply pressure decreases at a lower rate to zero.

The 3rd supply pressure (Curve 231") is greater than minimum pressure required for maximum retarder torque (Curve 234") up to the governor step speed (G) and has the peak maximum value (point 233") at transition speed (T") higher than in the first embodiment. Thus the net friction brake apply pressure (Curve 243") has a constant intermediate pressure value from zero speed (point 251") to an intermediate speed (I) at point 252", and then decreases at a high rate and then a lower rate to zero, inversely relative to increasing 3rd supply pressure (Curve 231") and directly with 1st and 2nd supply pressures (Curve 236") to zero pressure at transition speed (T", point 253"). Friction brake net apply pressure is zero in the high speed range, as in the other constructions, so there is no friction brake torque in the high speed range. Friction brake torque varies similarly to net apply pressure (Curve 243").

Retarder torque increases at a high rate in the low speed range up to governor step speed (G) because retarder inlet pressure (Curve 231″, FIG. 9) is greater than required retarder inlet pressure (Curve 234″) to provide maximum retarder torque capacity as it increases with speed. Then as retarder inlet pressure (Curve 231″) increases at a lower rate from a rate change intermediate value (point 249″) at governor step speed (G) to peak pressure value (point 233″) at transition speed (T″), retarder torque increases at a similar low rate. Then as retarder pressure (Curve 236″) decreases with increasing speed from transition speed (T″) to maximum speed in the high speed range, the retarder torque similarly decreases with increasing speed. The total torque (Curve 246″) is the sum of the friction brake torque and retarder torque and, at zero speed, has an intermediate value (point 248″), the same as zero speed friction brake torque, and, after a small decrease due to the friction brake coefficient of friction changing from static to dynamic, increases with speed at a high rate due to increasing retarder torque, to a maximum value at intermediate speed (I). Then from intermediate speed (I) to the governor step speed (G), due to friction brake net apply pressure and torque decreasing more than retarder torque increases, the total torque decreases. Then from governor step speed (G) to transition speed, due to retarder pressure and torque increasing and retarder pressure and torque increasing at nearer the same rate, total torque is about constant or slightly decreasing. At speeds above transition speed (T″), there is no friction brake torque and, due to decreasing retarder inlet pressure, retarder and total torque (Curve 246″) decrease. Thus total power (Curve 242″) increases with speed at a moderate, somewhat constant, rate to approximate a straight line relation with speed.

In this preferred second modification, brake demand pressure in line 137 at switching pressure, e.g., 15 psi, also switches retarder valve 142, but on increasing from switching to maximum pressure, e.g., 90 psi, provides increasing 2nd supply pressure from zero to a maximum which, at zero speed, is equal to the maximum 1st supply pressure (point 237″, FIG. 9, on Curve 236″) and, at higher speeds, is limited by 1st supply pressure (Curve 236″). Thus brake demand pressure above the design maximum will not further increase the full brake demand brake apply pressure (Curve 236″, FIG. 9), retarder inlet pressure (Curve 231″ to transition speed T″, and then Curve 236″), and friction brake net apply pressure (Curve 243″), so the maximum friction, retarder and total brake torques are speed-controlled and the same at full brake demand and abnormally higher brake demand pressures. In the low speed range, decreasing brake demand first reduces 2nd supply or friction brake apply pressure to 3rd supply or retarder inlet pressure to first reduce friction brake net apply pressure and torque to zero, and then also reduces 3rd supply pressure to reduce retarder torque. In the high speed range, decreasing brake demand reduces both 2nd and 3rd supply pressures, which are the same, to decrease retarder inlet pressure and torque. As speed increases, maximum retarder inlet pressure and torque are provided at lower brake demand pressure values.

Retarder valve 142, in response to decreasing brake demand, decreases the 2nd supply pressure to decrease friction brake apply pressure (Curve 236″, FIG. 9) to a constant lower value (Curve 241″, FIG. 10) at lower speeds providing a higher 1st supply pressure, and is the same as 1st supply pressure (Curve 236″, FIG. 10) at higher speeds providing a lower 1st supply pressure. At a partial brake demand, e.g., 50 psi brake demand pressure, the 2nd supply pressure (Curve 241″, FIG. 10) is less than 1st supply pressure (Curve 236″, FIG. 9) for full brake demand pressure, e.g., 90 psi, except at high speeds providing a lower 1st supply pressure (Curve 236″).

For partial brake demand, the 3rd supply pressure, which provides retarder inlet pressure, has the lower pressure value of 3rd supply pressure values (FIG. 9, Curve 231″ in the low speed range and Curve 236″ in the high speed range), as regulated by the 1st and 2nd regulator valves 200″ and 143″, and the partial constant value (Curve 241″, FIG. 10) at partial brake demand values. Since 2nd supply pressure (Curve 241″, FIG. 10) is lower than the regulated values (Curve 231″, FIG. 9) of 2nd regulator valve 143″ in the low speed range and the regulated 1st supply pressure (Curve 236″) up to a very high speed in the high speed range, 3rd supply pressure has a constant value (Curve 241″) up to this very high speed and then is the same as lower decreasing 1st supply pressure (Curve 236″) up to maximum speed. Since at this partial brake demand, 2nd and 3rd supply pressure, respectively friction brake apply pressure and retarder inlet or friction brake release pressure, are the same at all speeds, friction brake net apply pressure and torque are zero at all speeds. Decreasing brake demand decreases friction brake net apply pressure and torque at a higher rate than it decreases retarder inlet pressure and torque to reduce and discontinue friction brake use with decreasing brake demand.

At partial torque demand, the total torque (Curve 246″) in the low speed range is thus initially the same as friction brake torque, then increases at a high rate with increasing retarder torque, and then decreases to retarder torque as friction brake torque decreases to zero at transition speed (T″) and, in the high speed range, is the same as retarder torque.

Figure 10:
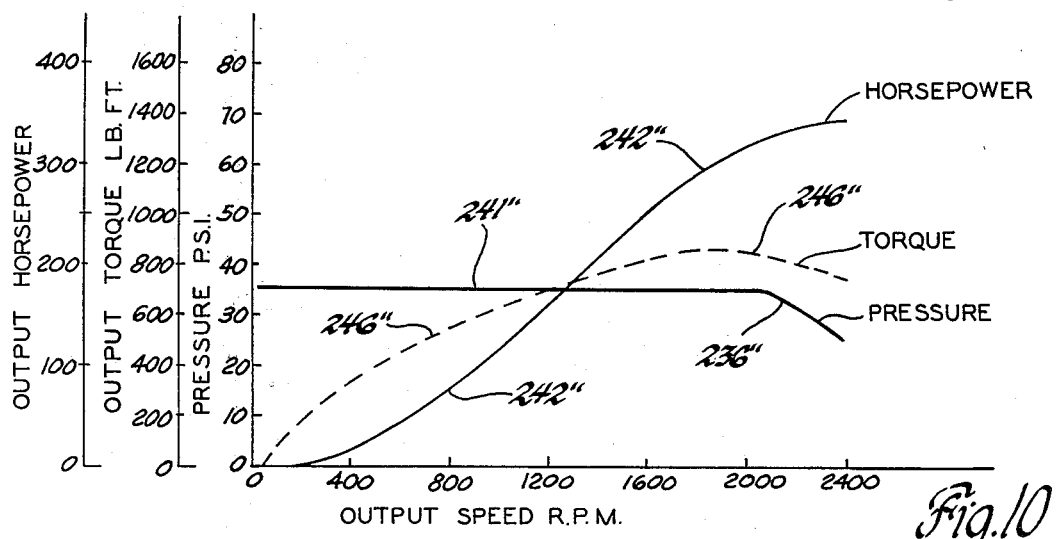
FIG. 10 shows pressure, torque, and power curves plotted relative to speed for the second modification, FIG. 4, at a partial brake demand.

At low brake demand, e.g., 50 psi, brake demand pressure shown in FIG. 10, since there is no friction brake torque, retarder torque plus losses provides total torque (Curve 246″) which increases with speed at a decreasing rate to a high value at a high speed, and then decreases approaching maximum speed. This total torque provides total power (Curve 242″, FIG. 10) increasing at an increasing rate and then at a decreasing rate with increasing speed to provide total power increasing with increasing speed in a somewhat linear or an approximate straight line relation. While total power (Curve 246″) is reduced more in the low speed range than in the high speed range relative to the same decrease of brake demand, brake demand may be increased to obtain any desired degree of brake power up to the maximum.

In the embodiments of FIGS. 2 and 4, at low brake demand, retarder power is increased with increasing brake demand and speed providing maximum retarder power at moderate brake demand and high speeds and, at higher brake demand in the low speed range, friction brake power increases with increasing brake demand and decreases with increasing speed. In the FIG. 3 embodiment, there is also provided at low brake demand in the low speed range, friction brake power increasing with increasing brake demand and decreasing with increasing speed.

In these brake units retarder torque increases highly exponentially with speed when retarder inlet pressure similarly increases, and increases exponentially at constant retarder inlet pressure, and friction brake torque increases linearly with net brake apply pressure. In the low speed range, retarder inlet pressure is sufficient and increases to meet retarder inlet pressure requirements for near maximum capacity retarder torque, and decreases net friction brake apply pressure and torque to provide decreasing or substantially constant total brake torque. In the high speed range, decreasing retarder inlet pressure on an exponential governor curve provides similarly decreasing total torque. Thus total power increases somewhat linearly with speed, at a slightly higher rate at low speeds and at a lower rate at high speeds.

In the above description of these brake units and their operations, the resultant change of the brake control pressures, torque and power has been discussed relative to increasing speed for more conventional reading of the curves from left to right. Such operation would be used by a driver employing brake demand to delay the increase of speed. More often, a driver would employ brake demand at high speed to decrease speed, so such resultant changes of the brake control pressures, torque and power would occur in the same manner, but oppositely relative to decreasing speed.

It will be apparent that further modifications of the invention may be made.

The embodiments of the invention in which an exclusive property or privilege is claimed are defined as follows:

1. In a brake assembly: hydrodynamic means having a bladed stator and a bladed rotor mounted for rotation at varying speeds forming a brake chamber with an inlet delivering inlet pressure to said chamber and an outlet operative during rotation of said rotor with fluid in said brake chamber to pump fluid from said inlet to said outlet and to provide hydrodynamic brake torque increasing with speed and said inlet pressure; the improvement comprising: supply means for providing fluid under pressure having a regulated pressure varying with speed to provide a pressure increasing in proportion to hydrodynamic brake torque as it increases with speed up to a maximum pressure in a low speed range and decreasing in proportion to increasing speed in a high speed range; brake control means connected to said inlet and said supply means and including an exhaust and brake demand signal means providing a brake demand signal operative in brake-off position to connect said inlet to said exhaust, and in the brake-on position to connect said outlet to said inlet and to regulate the fluid pressure supplied to said inlet by selectively connecting said inlet to said exhaust and connecting said supply means to said inlet to regulate the pressure in said inlet and said brake chamber proportional to said brake demand signal from said brake demand signal means at pressure values up to said maximum pressure of said supply means varying with speed to provide hydrodynamic brake torque increasing with speed up to a maximum in said low speed range and to provide up to a decreasing hydrodynamic brake torque with increasing speed in said high speed range to reduce the increase of hydrodynamic brake power with increasing speed in the high speed range.

2. In a brake unit, retarder means providing retarder torque increasing linearly with increasing retarder inlet pressure and exponentially with increasing speed and having high capacity retarder inlet pressure requirements for high torque capacity increasing exponentially with speed to provide high capacity retarder torque increasing exponentially with speed; a source of regulated fluid pressure having at least a high pressure value; the improvement comprising: a first regulator valve means for receiving first inlet fluid pressure and supplying the lower of said first inlet fluid pressure and a regulated fluid pressure having a similar high pressure value from zero to a transition speed and decreasing from said similar high pressure value to a lower intermediate pressure value very substantially less than said high capacity retarder inlet pressure requirements to provide decreasing retarder torque as speed increases from said transition speed to maximum speed as first regulated pressure; a second regulator valve means receiving second inlet fluid pressure and supplying the lower of said second inlet fluid pressure and regulated pressure increasing with speed to meet said high capacity retarder inlet pressure requirements from a minimum value at zero speed to said lower transition pressure at transition speed as second regulated pressure; a retarder regulator valve means receiving third inlet fluid pressure and supplying the lower of said third inlet fluid pressure and fluid pressure increasing from a minimum to a maximum about the same as said lower transition fluid pressure as third regulated pressure and connecting said source and first, second, and retarder regulator valve means in series to supply the lower of said first, second, and third regulated pressures as retarder inlet pressure to said retarder means to provide retarder torque increasing with speed increasing from zero to said transition speed and decreasing retarder torque with increasing speed from said transition speed to maximum speed and total power increasing somewhat linearly with speed.

3. In a brake assembly: hydrodynamic brake means having a bladed stator and a bladed rotor mounted for rotation at varying rotor speed and forming a brake chamber with an inlet for delivering inlet pressure to said brake chamber, and an outlet operative during rotation of said rotor with fluid in said brake chamber to pump fluid from said inlet to said outlet and having high inlet pressure requirements to provide high hydrodynamic brake torque both increasing with rotor speed and to provide hydrodynamic brake torque increasing with rotor speed and said inlet pressure; the improvement comprising: supply means providing regulated pressure at low speeds in a low speed range greater than said high inlet pressure requirements and at higher speeds in said low speed range increasing with increasing rotor speed to a maximum peak pressure value to provide maximum hydrodynamic brake torque, and in a high speed range decreasing with increasing rotor speed; brake control means connected to said inlet and said supply means and including an exhaust, and brake demand signal means providing a brake demand signal operative in brake-off position to connect said outlet to said exhaust, and in the brake-on position to connect said outlet to said inlet and to regulate said inlet pressure by selectively connecting said inlet to said exhaust and connecting said supply means to said inlet to regulate said inlet pressure proportional to said brake demand signal at pressure values up to the regulated pressure of said supply means varying with rotor speed to provide up to said maximum hydrodynamic brake torque increasing with rotor speed in said low speed range and to provide up to a reduced hydrodynamic brake torque with increasing rotor speed in said high speed range to reduce the increase of hydrodynamic brake power with increasing rotor speed in the high speed range.

4. In a brake assembly: hydrodynamic brake means having a bladed stator and a bladed rotor mounted for rotation at varying speed and forming a brake chamber with an inlet delivering inlet pressure to said brake chamber and an outlet, and operative during rotation of said rotor with fluid in said brake chamber, to pump fluid from said inlet to said outlet and provide hydrodynamic brake torque increasing with increasing inlet pressure to a high torque value at each speed requiring a high capacity inlet pressure and the high torque value and high capacity inlet pressure increasing with speed; the improvement comprising: supply means for providing fluid under pressure having a regulated pressure, in a low speed range up to a transition speed, not less than said high capacity inlet pressure and, in a high speed portion of said low speed range increasing in proportion to speed to the high capacity inlet pressure at said transition speed and, in a high speed range from said transition speed to maximum speed, decreasing in proportion to increasing rotor speed; brake control means connected to said inlet and said supply means and including an exhaust and brake demand signal means providing a brake demand signal operative in brake-off position to connect said inlet and outlet to said exhaust, and operative in the brake-on position to connect said outlet to said inlet and to regulate the fluid pressure supplied to said inlet by selectively connecting said inlet to said exhaust and connecting said supply means to said inlet to regulate pressure in said inlet and in said brake chamber proportional to said brake demand signal at pressure values up to the regulated pressure of said supply means and varying with the speed of said rotor to provide up to maximum hydrodynamic brake torque increasing with speed in said low speed range, and to provide up to a decreasing hydrodynamic brake torque with increasing speed in said high speed range to reduce the increase of hydrodynamic brake power to a moderately increasing somewhat linear relation with increasing speed in the high speed range.

5. In a brake unit: retarder means operative when filled with fluid for providing retarder torque increasing linearly with increasing retarder inlet pressure and exponentially with increasing speed and having high capacity retarder inlet pressure requirements for high capacity retarder torque and both increasing exponentially with speed; friction brake means applied by brake apply pressure and released by said retarder inlet pressure for providing friction brake torque increasing linearly with increasing net brake apply pressure, said apply pressure minus said retarder inlet pressure; the improvement comprising: supply means including regulator valve means responsive to speed for providing regulated supply pressure, in a low speed range up to a transition speed, initially at least meeting and then increasing to closely meet said high capacity retarder inlet pressure requirements and, in a high speed range above said transition speed, decreasing to meet lower retarder inlet pressure requirements for moderately decreasing lower retarder torque with increasing speed; control means operatively connected to said retarder means, said friction brake means, and said supply means and including brake demand signal means, and pressure regulating means responsive to said brake demand signal means and operative at low speeds from zero up to a similar transition speed for regulating brake apply pressure proportional to brake demand and supplying said brake apply pressure to said friction brake means to apply said friction brake means and operative in said low and high speed ranges to supply the lower of said regulated supply pressure and a pressure regulated in proportion to brake demand as said retarder inlet pressure to fill said retarder means to provide retarder torque increasing in proportion to increasing brake demand, in said low speed range, up to said high capacity retarder torque, and in said high speed range, up to said decreasing lower retarder torque, and for connecting said retarder inlet pressure to said friction brake means to release said friction brake means to provide said net brake apply pressure and friction brake torque proportional to brake demand and decreasing with increasing speed up to a similar transition speed to provide total brake torque having high torque up to a similar transition speed, and then decreasing torque with increasing speed to provide total brake power increasing somewhat linearly with increasing speed.

6. The invention defined in claim 5, and said pressure regulating means of said control means decreasing said brake apply pressure at a higher rate than retarder inlet pressure is decreased in response to the same decrease of brake demand so net brake apply pressure is reduced to zero and there is no friction brake torque and reduced retarder inlet pressure and retarder torque at low brake demand values.

7. The invention defined in claim 5, and said friction brake means being cooled by said retarder inlet pressure and including a fluid motor having a cylinder, a piston slidable in said cylinder, a restricted passage through said piston; and said brake apply pressure being connected to said cylinder for brake apply and said restricted passage delaying brake apply until retarder inlet pressure is supplied for cooling said friction brake means.

8. The invention defined in claim 5, and said supply means including a source of high fluid pressure; said regulator valve means including a first regulator valve operative when supplied by a higher pressure to regulate a first supply pressure decreasing in said low speed range and further decreasing in said high speed range to meet said lower retarder inlet pressure requirements, and a second regulator valve operative when supplied by a higher pressure to regulate a second supply pressure meeting said high capacity retarder inlet pressure requirements, and said first and second regulator valves being connected in a series circuit; and said control means having said source connected to supply said series circuit and said pressure regulating means connected to said series circuit for regulating and supplying said retarder inlet pressure.

9. The invention defined in claim 8, and said control means having said source connected directly to said first regulator valve for supplying first supply pressure to said pressure regulating means for regulating said brake apply pressure at the lower value of said first supply pressure and a regulated pressure linearly proportional to brake demand, and supplying said brake apply pressure to said friction brake means to apply said friction brake means and to said second pressure regulator valve for regulating said retarder inlet pressure at the lower pressure value of said brake apply pressure and said second supply pressure, and supplying said retarder inlet pressure to said friction brake means to release said friction brake means and to said retarder means to fill said retarder means.

10. The invention defined in claim 8, and said regulator valve means of said supply means providing said regulated supply pressure at lower speeds in said low speed range having intermediate pressure values substantially greater than said high capacity retarder inlet pressure requirements to provide a substantially constant intermediate value net brake apply pressure and to provide retarder inlet pressure flow under intermediate pressure for friction brake cooling, and at higher speeds in said low speed range, to provide said regulated supply pressure increasing to closely meet said high capacity retarder inlet pressure requirements.

11. The invention defined in claim 8, and said pressure regulating means including first regulating means providing a brake demand pressure proportional to brake demand; connecting means including cut-off valve means responsive to speed operative for connecting said brake demand pressure to said friction brake means to apply said friction brake means only at low speeds up to said similar transition speed; and a second regulating means responsive to said brake demand pressure at all speeds supplied with regulated supply pressure and supplying retarder inlet pressure to said friction brake means for release and to said retarder means.

12. In a brake unit, retarder means providing retarder torque increasing linearly with increasing retarder inlet pressure and exponentially with increasing speed and having high capacity retarder inlet pressure requirements for high torque capacity increasing exponentially with speed to provide high capacity retarder torque increasing exponentially with speed; friction brake means applied by apply pressure and released by retarder inlet pressure providing friction brake torque increasing linearly with increasing net brake apply pressure, said apply pressure minus said retarder inlet pressure; a source of regulated fluid pressure having at least a high pressure value; a first regulator valve means for receiving first inlet fluid pressure and supplying the lower of said first inlet fluid pressure and a regulated fluid pressure decreasing from said high pressure value through a lower transition pressure value to a lower intermediate pressure value as speed increases respectively from zero through a transition speed to maximum speed as first regulated pressure; a second regulator valve means receiving second inlet fluid pressure and supplying the lower of said second inlet fluid pressure and regulated pressure increasing with speed to meet said high capacity retarder inlet pressure requirements from a minimum value at zero speed to said lower transition pressure at transition speed as second regulated pressure; a retarder regulator valve means receiving third inlet fluid pressure and supplying the lower of said third inlet fluid pressure and regulated fluid pressure increasing from a minimum to a maximum about the same as said lower transition fluid pressure as third regulated pressure and connecting said source and first and retarder regulator valve means in series to supply the lower of said first and third regulated pressures as brake apply pressure to said friction brake means, and connecting said source and first, second, and retarder regulator valve means in series to supply the lower of said first, second, and third regulated pressures as retarder inlet pressure to said retarder means and friction brake means for release to provide retarder torque increasing and friction brake torque decreasing with speed increasing from zero to said transition speed and decreasing retarder torque with increasing speed from said transition speed to maximum speed and total power increasing somewhat linearly with speed.

13. In a brake unit, retarder means providing retarder torque increasing linearly with increasing retarder inlet pressure and exponentially with increasing speed and having high capacity retarder inlet pressure requirements for high torque capacity increasing exponentially with speed to provide high capacity retarder torque increasing exponentially with speed; friction brake means applied by apply pressure and released by retarder inlet pressure providing friction brake torque increasing linearly with increasing net brake apply pressure, said apply pressure minus said retarder inlet pressure; a source of regulated fluid pressure having at least a high pressure value; a first regulator valve means for receiving first inlet fluid pressure and supplying the lower of said first inlet fluid pressure and a regulated fluid pressure having a similar high pressure value from zero to a transition speed and decreasing from said similar high pressure value to a lower intermediate pressure value very substantially less than said high capacity retarder inlet pressure requirements to provide decreasing retarder torque as speed increases from said transition speed to maximum speed as first regulated pressure; a second regulator valve means receiving second inlet fluid pressure and supplying the lower of said second inlet fluid pressure and regulated pressure increasing with speed to meet said high capacity retarder inlet pressure requirements from a minimum value at zero speed to said lower transition pressure at transition speed as second regulated pressure; a retarder regulator valve means receiving third inlet fluid pressure and supplying the lower of said third inlet fluid pressure and regulated fluid pressure increasing from a minimum to a maximum about the same as said lower transition fluid pressure as third regulated pressure, and connecting said source and first and retarder regulator valve means in series to supply the lower of said first and third regulated pressures as brake apply pressure to said friction brake means and further connecting said brake apply pressure through said second regulator valve means to said retarder means and friction brake means for release to supply the lower of said first, second, and third regulated pressures as retarder inlet pressure to said retarder means and friction brake means for release to provide retarder torque increasing and friction brake torque decreasing with speed increasing from zero to said transition speed and decreasing retarder torque with increasing speed from said transition speed to maximum speed and total power increasing somewhat linearly with speed.

14. In a brake assembly: retarder means having a chamber, an outlet, and an inlet for delivering inlet pressure to said chamber; a rotor mounted for rotation in said chamber and operative during rotation when filled with fluid to deliver fluid to said outlet and to provide hydrodynamic retarder torque increasing with inlet pressure to a high torque value at a high capacity inlet pressure value at each speed and to increasing values with increasing speed; governor means providing a speed signal proportional to rotor speed; friction brake means responsive to brake apply pressure for brake apply and to said inlet pressure for brake release providing a net apply pressure providing brake torque proportional to net apply pressure; a source of high fluid pressure; the improvement comprising: brake control means including first supply regulator means supplied by said source and responsive to said speed signal for regulating first supply pressure decreasing from a high pressure to an intermediate pressure proportional to increasing speed from zero speed to maximum speed; second supply regulator means operative in response to said speed signal when supplied by higher fluid pressure for regulating third supply pressure increasing with speed in a low speed range from zero speed to a transition speed at which first and third supply pressures are equal; first brake demand regulator means for regulating a first brake demand pressure proportional to brake demand; switching valve means operative in off position to exhaust said inlet and outlet and moved to on position by said brake demand pressure at a low brake demand to connect said outlet to said inlet; and second brake demand regulator means supplied by said first supply pressure and operative in response to said first brake demand pressure when supplied with higher pressure for regulating a second brake demand pressure proportional to brake demand; means connecting one of said first and second brake demand regulator means to supply one of said first and second brake demand pressure as brake apply pressure to said friction brake means; means connecting said first and second supply regulator valve means and said second brake demand means to supply the lowest of the regulated first and second supply pressures and second brake demand pressure as inlet pressure to said inlet.

* * * * *